US012477257B2

(12) United States Patent
Satyarthi et al.

(10) Patent No.: US 12,477,257 B2
(45) Date of Patent: Nov. 18, 2025

(54) ORCHESTRATION ADAPTER FOR OPTICAL POWER CONTROLS IN C+L BAND NETWORK

(71) Applicant: Infinera Corp., San Jose, CA (US)

(72) Inventors: Nikhil Satyarthi, Yelahanka (IN); Rajakumar Hegde, Karnataka (IN); Aryabhata Deshpande, Bommanahalli (IN); Ashok Kunjidhapatham, Devarachikkanahalli (IN); Sanjeev Ramachandran, Karnataka (IN); Dinesh Kumar Prakasam, Madurai (IN); Baranidhar Ramanathan, Kasavanahalli (IN)

(73) Assignee: Infinera Corp., San Jose, CA (US)

( * ) Notice: Subject to any disclaimer, the term of this patent is extended or adjusted under 35 U.S.C. 154(b) by 589 days.

(21) Appl. No.: 18/146,707

(22) Filed: Dec. 27, 2022

(65) Prior Publication Data

US 2024/0214714 A1 Jun. 27, 2024

(51) Int. Cl.
*H04J 14/02* (2006.01)
*H04L 41/0816* (2022.01)
(Continued)

(52) U.S. Cl.
CPC ..... *H04Q 11/0066* (2013.01); *H04L 41/0816* (2013.01); *H04L 41/22* (2013.01);
(Continued)

(58) Field of Classification Search
CPC ............... H04Q 11/66; H04Q 11/0062; H04Q 11/0067; H04J 14/0212; H04J 14/021; H04J 14/02; H04J 14/0221; H04J 14/0202; H04J 14/0201; H04J 14/0216; H04J 14/0217; H04B 10/0795; H04B 10/07955; H04L 41/0816; H04L 41/22
USPC ........ 398/79, 83, 33, 38, 45, 48, 49, 25, 26, 398/27, 58, 59, 135, 136, 158, 159, 160, 398/46, 47, 50, 52, 53, 56, 57
See application file for complete search history.

(56) References Cited

U.S. PATENT DOCUMENTS 7,394,953 B1 7/2008 Nagarajan et al.
7,995,921 B2 8/2011 Grubb
(Continued)

*Primary Examiner* — Hanh Phan

(57) ABSTRACT

An orchestration adapter of an optical network is herein described. The orchestration adapter comprises a processor and a non-transitory computer-readable medium storing processor-executable instructions that, when executed, cause the processor to: store a mapping of a correspondence between logical-view passbands and physical-view passbands, each of the physical-view passbands comprising one or more partition(s), each corresponding to a particular logical-view passband; receive a logical-view operation request from an orchestrator of a network element, the logical-view operation request identifying an operation and a first logical-view passband, the operation being executable by a control block of the network element; and send a physical-view operation request to the control block, the physical-view operation request comprising instructions to cause the control block to execute the operation, the instructions identifying the operation and a first physical-view passband, a first partition of the first physical-view passband corresponding to the first logical-view passband.

21 Claims, 9 Drawing Sheets

(51) Int. Cl.
*H04L 41/22* (2022.01)
*H04Q 11/00* (2006.01)

(52) U.S. Cl.
CPC ................ *H04Q 2011/0016* (2013.01); *H04Q 2011/0081* (2013.01)

(56) References Cited

U.S. PATENT DOCUMENTS

| | | | | |
|---|---|---|---|---|
| 8,155,531 | B2 | 4/2012 | Murthy et al. | |
| 8,223,803 | B2 | 7/2012 | Sprague | |
| 8,639,118 | B2 | 1/2014 | Wu et al. | |
| 9,154,258 | B1 | 10/2015 | Mertz et al. | |
| 9,654,852 | B2 * | 5/2017 | Yin ..................... | H04J 14/0205 |
| 2012/0052541 | A1 | 3/2012 | Oakley | |
| 2012/0082453 | A1 | 4/2012 | Wu et al. | |
| 2017/0078147 | A1 * | 3/2017 | Xia ..................... | H04J 14/0212 |
| 2023/0412950 | A1 * | 12/2023 | Anazawa ........... | H04Q 11/0062 |

* cited by examiner

255a

256a

| PN-Sf, PN-Ef | PbKey | OrchIntent | ProvIntent |
|---|---|---|---|
| 193912500, 193937500 | 1 | ACTIVATE | PROVISIONED |
| 193937500, 193962500 | 1 | DEACTIVATE | UNPROVISIONED |
| 194112500, 194137500 | 2 | ACTIVATE | PROVISIONED |
| 194137500, 194162500 | 2 | DEACTIVATE | UNPROVISIONED |
| 194312500, 194337500 | 3 | ACTIVATE | PROVISIONED |
| 194337500, 194362500 | 3 | DEACTIVATE | UNPROVISIONED |
| 194512500, 194537500 | 4 | ACTIVATE | PROVISIONED |
| 194537500, 194562500 | 4 | DEACTIVATE | UNPROVISIONED |

| PbKey | Partition List <(PN-Sf, PN-Ef)> |
|---|---|
| 1 | (193912500, 193937500), (193937500, 193962500) |
| 2 | (194112500, 194137500), (194137500, 194162500) |
| 3 | (194312500, 194337500), (194337500, 194362500) |
| 4 | (194512500, 194537500), (194537500, 194562500) |

FIG. 6B

ORCHESTRATION ADAPTER FOR OPTICAL POWER CONTROLS IN C+L BAND NETWORK

STATEMENT REGARDING FEDERALLY SPONSORED RESEARCH OR DEVELOPMENT

Not Applicable.

BACKGROUND

Orchestrated line systems, like those used in C/L-band optical transport networks, typically comprise an orchestrator as a higher-level software entity (e.g., running as a micro-service) operating over one or more optical power control loop (hereinafter, the "control block") which may adjust a configuration of the optical devices comprising the orchestrated line system. While the control block may configure the optical devices directly, the orchestrator module is generally intended to be location-, host-, device-, and vendor-independent. It is desirable that any device-related dependencies (e.g., wavelength-selective switch (WSS) passband size restrictions) of the optical devices should be confined to the control block, as configuring the orchestrator to manage such device-related dependencies could cause the orchestrator to become overly complex and non-scalable.

The orchestrator is thus abstracted from any device-specific constraints by keeping such constraints confined to the control block. This can lead to the orchestrator working on a user view (i.e., a logical view) which is different from the device view (i.e., a physical view) on which the control block typically operate. Furthermore, the orchestrator may transmit a logical-view power control operation (PCO) request to the control block, which may be received by the control block in the form of multiple physical-view PCO requests.

SUMMARY OF THE DISCLOSURE

In order to facilitate communication between the orchestrator module and the control block module, the present disclosure is generally directed to a software adaptation module called an orchestration adapter which may act as a middleware between the orchestrator module and the control block module. In some embodiments, the orchestration adapter includes a processor executing processor-executable code to perform the following functionalities: adapting information transmitted between the orchestrator and the control block, each of which operate in different views (i.e., a logical view seen by the orchestrator versus a physical view seen by the control block); decomposing a logical-view operation request into multiple physical-view operation requests and staging the physical-view operation requests to transmit the physical-view operation requests to the control block in sequence; and consolidating the physical-view responses received from the control block as they correspond to the physical-view operation requests and reporting completion of the operation to the orchestrator.

In one aspect, the present disclosure is directed to an orchestration adapter, comprising: a processor; and a non-transitory computer-readable medium storing processor-executable instructions that, when executed by the processor, cause the processor to: store a mapping indicative of a correspondence between a plurality of logical-view passbands and a plurality of physical-view passbands, each of the plurality of physical-view passbands comprising one or more partition, each of the one or more partition corresponding to a particular logical-view passband of the plurality of logical-view passbands; receive a logical-view operation request from an orchestrator of a network element in an optical network, the logical-view operation request identifying an operation and a first logical-view passband of the plurality of logical-view passbands, the operation being executable by a control block of the network element, the first logical-view passband being associated with the operation; and send a physical-view operation request to the control block, the physical-view operation request comprising instructions to cause the control block to execute the operation, the instructions identifying the operation and a first physical-view passband of the plurality of physical-view passbands, a first partition of the one or more partition of the first physical-view passband corresponding to the first logical-view passband.

BRIEF DESCRIPTION OF THE DRAWINGS

The accompanying drawings, which are incorporated in and constitute a part of this specification, illustrate one or more embodiments described herein and, together with the description, explain these embodiments. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIG. 6A is an exemplary embodiment of an orchestrator-to-control block table constructed in accordance with the present disclosure;

FIG. 6B is an exemplary embodiment of a control block-to-orchestrator table constructed in accordance with the present disclosure;

DETAILED DESCRIPTION

Figure 1:
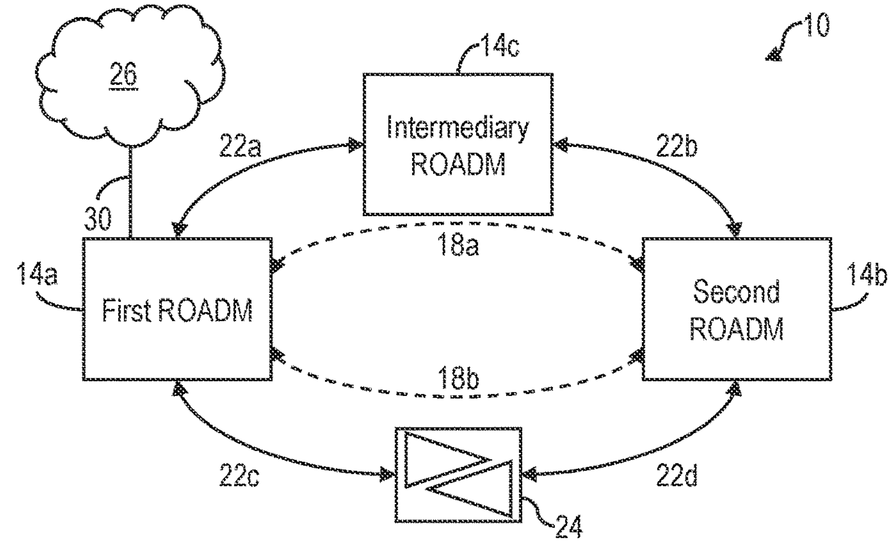
FIG. 1 is a diagram of an exemplary embodiment of a transport network constructed in accordance with the present disclosure.

Before explaining at least one embodiment of the inventive concept(s) in detail by way of exemplary language and results, it is to be understood that the inventive concept(s) is not limited in its application to the details of construction and the arrangement of the components set forth in the following description. The inventive concept(s) is capable of other embodiments or of being practiced or carried out in various ways. As such, the language used herein is intended to be given the broadest possible scope and meaning; and the embodiments are meant to be exemplary—not exhaustive. Also, it is to be understood that the phraseology and terminology employed herein is for the purpose of description and should not be regarded as limiting.

Headings are provided for convenience only and are not to be construed to limit the invention in any manner. Embodiments illustrated under any heading or in any portion of the disclosure may be combined with embodiments illustrated under the same or any other heading or other portion of the disclosure. Any combination of the elements described herein in all possible variations thereof is encompassed by the invention unless otherwise indicated herein or otherwise clearly contradicted by context.

Unless otherwise required by context, singular terms shall include pluralities and plural terms shall include the singular, with the exception that the term "plurality" as used herein, does not include the singular.

All patents or published patent applications referenced in any portion of this application are herein expressly incorporated by reference in their entirety to the same extent as if each individual patent or publication was specifically and individually indicated to be incorporated by reference.

All of the assemblies, systems, kits, and/or methods disclosed herein can be made and executed without undue experimentation in light of the present disclosure. Where a method claim does not specifically state in the claims or description that the steps are to be limited to a specific order, it is in no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

As utilized in accordance with the present disclosure, the following terms, unless otherwise indicated, shall be understood to have the following meanings:

The use of the term "a" or "an" when used in conjunction with the term "comprising" in the claims and/or the specification may mean "one," but it is also consistent with the meaning of "one or more," "at least one," and "one or more than one." The term "plurality" refers to "two or more."

The use of the term "at least one" will be understood to include one as well as any quantity more than one. In addition, the use of the term "at least one of X, Y, and Z" will be understood to include X alone, Y alone, and Z alone, as well as any combination of X, Y, and Z.

The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive.

Circuitry, as used herein, may be analog and/or digital components, or one or more suitably programmed processors (e.g., microprocessors) and associated hardware and software, or hardwired logic. Also, "components" may perform one or more functions. The term "component" may include hardware, such as a processor (e.g., microprocessor), a combination of hardware and software, and/or the like.

Software may include one or more computer readable instruction that when executed by one or more component, e.g., a processor, causes the component to perform a specified function. It should be understood that the algorithms described herein may include multiple computer executable instructions and be stored on one or more non-transitory computer readable medium. Exemplary non-transitory computer readable mediums may include random-access memory (RAM), a read only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory computer readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

The optical network has one or more band, and preferably at least two bands. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength of the C-Band is smaller than the wavelength of the L-Band, the wavelength of the C-Band may be described as a short, or a shorter, wavelength relative to the L-Band. Similarly, because the wavelength of the L-Band is larger than the wavelength of the C-Band, the wavelength of the L-Band may be described as a long, or a longer, wavelength relative to the C-Band.

As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz ("THz") frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channels may be called a channel group. Spectral loading may also be described as the addition of one or more channel group to a specific spectrum of light described by the light's wavelength to be supplied onto the optical fiber as the optical signal.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A Wavelength Selective Switch is a programmable device having source and destination fiber ports where the source and destination fiber ports and associated attenuation can be specified for a particular passband with a minimum bandwidth. Wavelength Selective Switches may be implemented using a variety of technologies, for example, Liquid Crystal on Silicon (LCoS), Microelectromechanical Mirrors (MEMS) arrays, etc. A WSS used for the C-band and a WSS for the L-band may be implemented using the same technology or different technologies.

A passband is a portion of an optical signal the WSS passes from a source fiber port to the destination fiber port. A passband comprises one or more slice and has a passband width based on the number of slices the WSS passes from the source fiber port to the destination fiber port. As such, a minimum passband width is the same as the minimum bandwidth of the WSS.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band, and/or typically within the 1565 nm-1625 nm range, known as L-Band. ROADM functions are facilitated via use of a combination of colorless, directionless, and contention-less (CDC) optical devices, which may include Wavelength Selective Switches (WSS), Multicast Switches (MCS), etc. Layer 0 may include the frequency grid (for example, as defined by ITU G.694.1), ROADMs, FOADMs, Amps, MUXes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed, e.g., together as multiple channels.

Referring now to the drawings, and in particular to FIG. 1, shown therein is a diagram of an exemplary embodiment of a transport network 10 constructed in accordance with the present disclosure. The transport network 10 is depicted as comprising a plurality of network elements. In general, the network elements may be implemented in a variety of ways. Nonexclusive examples include optical line terminals (OLTs), optical cross connects (OXCs), optical line amplifiers (OAs), optical add/drop multiplexer (OADMs) and/or reconfigurable optical add/drop multiplexers (ROADMs), interconnected by way of intermediate links. OLTs may be used at either end of a connection or intermediate link. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety.

As shown in FIG. 1, the network elements may include, for example, a plurality of ROADMs 14*a-n*, such as a first ROADM 14*a*, a second ROADM 14*b*, and an intermediary ROADM 14*c*, and one or more optical amplifier (OA) 24. Data transmitted within the transport network 10 from the first ROADM 14*a* to the second ROADM 14*b* may travel along a first optical path 18*a* formed by a first fiber optic line 22*a*, the intermediary ROADM 14*c*, and a second fiber optic line 22*b* to the second ROADM 14*b*, or the data may travel along a second optical path 18*b* formed by a third fiber optic line 22*c*, the OA 24, and a fourth fiber optic line 22*d*.

In some embodiments, a user may interact with a computer system 26 (e.g., via a user device (not shown)) that may be used to communicate with one or more of the ROADMs 14*a-n* (hereinafter "ROADM(s) 14") via a communication network 30. In some embodiments, the computer system 26 (described in more detail below in reference to FIG. 2) may comprise a processor and a memory comprising a data store that may store data such as version information, firmware version information, sensor data, system data, metrics, logs, tracing, and the like in a raw format as well as transformed data that may be used for tasks such as reporting, visualization, analytics etc. The data store may include structured data from relational databases, semi-structured data, unstructured data, time-series data, and binary data. The data store may be a data base, a remote accessible storage, or a distributed filesystem. In some embodiments, the data store may be a component of an enterprise network.

In some embodiments, the computer system 26 is connected to one or more of the ROADMs 14 via the communication network 30. In this way, the computer system 26 may communicate with each of the ROADMs 14, and may, via the communication network 30, transmit or receive data from each of the ROADMs 14. In other embodiments, the computer system 26 may be integrated into each of the ROADMs 14 and/or may communicate with one or more pluggable card within each of the ROADMs 14. In some embodiments, the computer system 26 may be integrated within one of the pluggable cards of the ROADM 14 itself. In some embodiments, the computer system 26 may be a remote network element.

The communication network 30 may be almost any type of network. For example, in some embodiments, the communication network 30 may be a version of an Internet network (e.g., a TCP/IP-based network). In some embodiments, the communication network 30 is the Internet. It should be noted, however, that the communication network 30 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like. It is conceivable that in the near future, embodiments of the present disclosure may use more advanced networking topologies.

If the communication network 30 is the Internet, a primary user interface of the computer system 26 may be delivered through a series of web pages or private internal web pages of a company or corporation, which may be written in hypertext markup language, JavaScript, or the like, and accessible by the user. It should be noted that the primary user interface of the computer system 26 may be another type of interface including, but not limited to, a Windows-based application, a tablet-based application, a mobile web interface, a VR-based application, an application running on a mobile device, and/or the like. In one embodiment, the communication network 30 may be connected to one or more of the user device, the computer system 26, the OAs 24, and the ROADMs 14.

The transport network 10 may be considered as a graph made up of interconnected individual network elements (i.e., the ROADMs 14 and the OAs 24). The transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical networks.

The optical signals carried on the fiber optic lines 22 may deteriorate as they travel over long distances. Accordingly, the OAs 24 may be operable to amplify the optical signals carried on the fiber optic lines 22 in substantially all of the C- and L-bands. Each of the OAs 24 may be, for example, an Erbium-Doped Fiber Amplifier (EDFA) or a Raman amplifier. The OAs 24 may further contain VOAs (not shown) through which the power levels may be controlled. The amplifier gain itself may be adjustable by a line amplifier or link control block 218 (to be discussed further below in reference to FIG. 5).

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the computer system 26 may interconnect via wired connections, wireless connections, or a combination thereof. For example, in one embodiment, the user device (not shown) and the computer system 26 may be integrated into the same device, that is, the user device (not shown) may perform functions and/or processes described as being performed by the computer system 26, described below in more detail.

Figure 2:
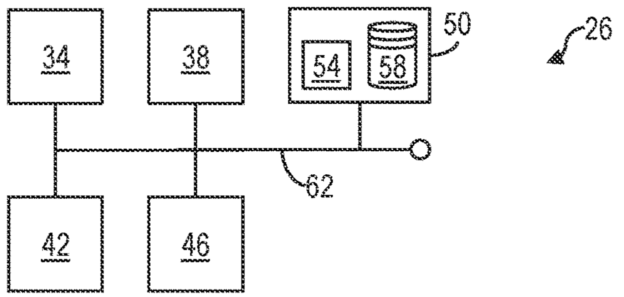
FIG. 2 is a block diagram of a computer system shown in FIG. 1.

Referring now to FIG. 2, shown therein is a diagram of an exemplary embodiment of the computer system 26 shown in FIG. 1. The computer system 26 may include, but is not limited to, embodiments as a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 26 may include one or more input device 34 (hereinafter "input device 34"), one or more output device 38 (hereinafter "output device 38"), one or more processor 42 (hereinafter "processor 42"), one or more communication device 46 (hereinafter "communication device 46") capable of interfacing with the communication network 30, one or more non-transitory computer readable medium 50 (hereinafter "memory 50") storing processor-executable code 54 (hereinafter, the "software applications 54") and a database 58, for example including, a web browser capable of accessing a website and/or communicating information and/or data over a wireless or wired network (e.g., the communication network 30), and/or the like. The software applications 54, when executed by the processor 42, may cause the processor 42 to perform one or more of the methods described herein. The input device 34, the output device 38, the processor 42, the communication device 46, and the memory 50 may be connected via a path 62 such as a data bus that permits communication among the components of the computer system 26.

In some embodiments, the processor 42 may comprise one or more processor 42 working together, or independently, to read and/or execute processor executable code and/or data, such as stored in the memory 50. The processor 42 may be capable of creating, manipulating, retrieving, altering, and/or storing data structures into the memory 50. Each element of the computer system 26 may be partially or completely network-based or cloud-based, and may or may not be located in a single physical location.

Exemplary embodiments of the processor 42 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 42 may be capable of communicating with the memory 50 via the path 62 (e.g., data bus). The processor 42 may be capable of communicating with the input device 34 and/or the output device 38.

The processor 42 may be further capable of interfacing and/or communicating with the network elements (e.g., the ROADMs 14 and/or the OAs 24) via the communication network 30 using the communication device 46. For example, the processor 42 may be capable of communicating via the communication network 30 by exchanging signals (e.g., analog, digital, optical, and/or the like) via one or more ports (e.g., physical or virtual ports) using a network protocol to provide information to the network elements (e.g., the ROADMs 14 and/or the OAs 24).

The memory 50 may store software applications 54 that, when executed by the processor 42, causes the computer system 26 to perform an action such as communicate with or control one or more component of the computer system 26, the transport network 10 (e.g., the ROADMs 14 and/or the OAs 24) and/or the communication network 30.

In some embodiments, the memory 50 may be located in the same physical location as the computer system 26, and/or one or more memory 50 may be located remotely from the computer system 26. For example, the memory 50 may be located remotely from the computer system 26 and communicate with the processor 42 via the communication network 30. Additionally, when more than one memory 50 is used, a first server memory 50 may be located in the same physical location as the processor 42, and additional server memory 50 may be located in a location physically remote from the processor 42. Additionally, the memory 50 may be implemented as a "cloud" non-transitory computer readable storage memory (i.e., one or more memory 50 may be partially or completely based on or accessed using the communication network 30).

The input device 34 may be capable of receiving information input from the user, another computer, and/or the processor 42, and transmitting such information to other components of the computer system 26 and/or the communication network 30. The input device 34 may include, but is not limited to, embodiment as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 38 may be capable of outputting information in a form perceivable by the user, another computer system, and/or the processor 42. For example, embodiments of the output device 38 may include, but are not limited to, a computer monitor, a screen, a touchscreen, a speaker, a website, a television set, a smart phone, a PDA, a cell phone, a fax machine, a printer, a laptop computer, a haptic feedback generator, a network interface, combinations thereof, and/or the like, for example. In some embodiments, the input device 34 and the output device 38 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

The communication network 30 may permit bi-directional communication of information and/or data between the computer system 26 and/or the network elements (e.g., the ROADMs 14 and/or the OAs 24) of the transport network 10. The communication network 30 may interface with the computer system 26 and/or the network elements (e.g., the ROADMs 14 and/or the OAs 24) in a variety of ways. For example, in some embodiments, the communication network 30 may interface by optical and/or electronic interfaces, and/or may use a plurality of network topographies and/or protocols including, but not limited to, Ethernet, TCP/IP, circuit switched path, combinations thereof, and/or the like. The communication network 30 may utilize a variety of network protocols to permit bi-directional interface and/or communication of data and/or information between the computer system 26 and/or the network elements (e.g., the ROADMs 14 and/or the OAs 24).

In some embodiments, the database 58 is a time-series database, a relational database, or a non-relational database. Examples of such databases include DB2®, Microsoft® Access, Microsoft® SQL Server, Oracle®, MySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 58 may be centralized or distributed across multiple systems.

Figure 3A:
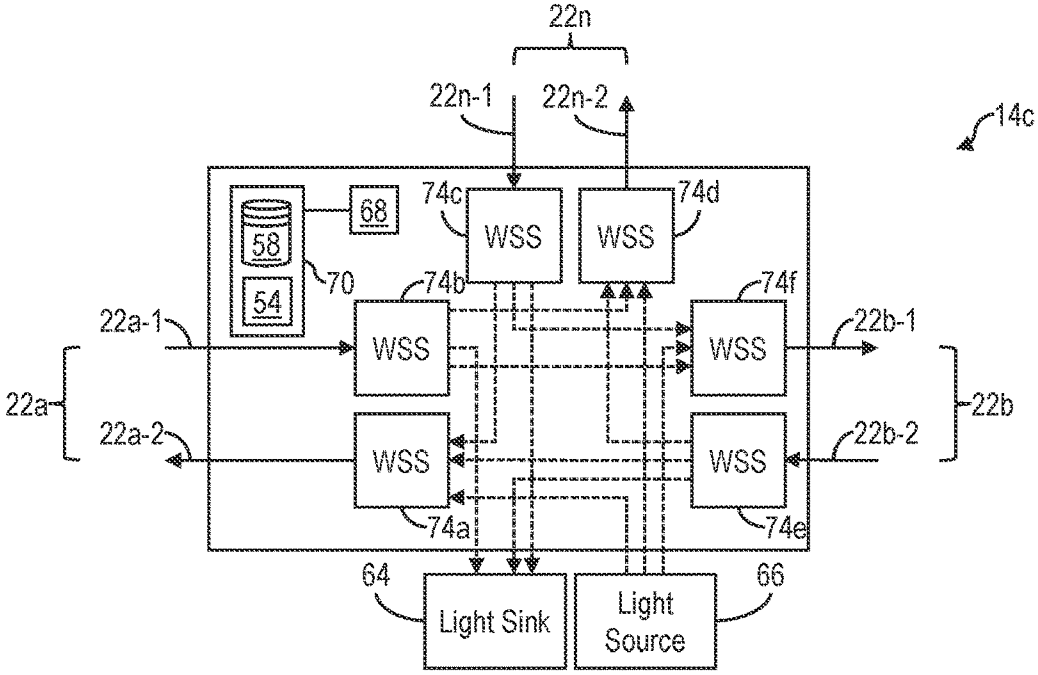
FIG. 3A is a block diagram of an intermediary ROADM shown in FIG. 1.

Referring now to FIG. 3A, shown therein is a diagram of the intermediary ROADM 14*c* shown in FIG. 1. In general, the ROADMs 14 transmit and receive data traffic and control signals. FIG. 3A illustrates an example of the intermediary ROADM 14*c* being a ROADM that interconnects the first fiber optic line 22*a* and the second fiber optic line 22*b*, as well as an nth fiber optic line 22*n*. The first ROADM 14*a* and the second ROADM 14*b* may be similar in construction and function as the intermediary ROADM 14*c*. For this reason, only the intermediary ROADM 14*c* will be described herein for purposes of brevity.

Each of the first fiber optic line 22*a* (shown herein as a first optical fiber line 22*a*-1 and a second optical fiber line 22*a*-2), the second fiber optic line 22*b* (shown herein as a first optical fiber line 22*b*-1 and a second optical fiber line 22*b*-2), and the nth fiber optic line 22*n* (shown herein as a first optical fiber line 22*n*-1 and a second optical fiber line 22*n*-2) may include optical fiber pairs, wherein each optical fiber of the pair carries optical signal groups propagating in opposite directions. As seen in FIG. 3A, for example, the first fiber optic line 22*a* includes the first optical fiber line 22*a*-1, which carries optical signals toward the intermediary ROADM 14*c*, and the second optical fiber line 22*a*-2 that carries optical signals output from the intermediary ROADM 14*c*. Similarly, the nth fiber optic line 22*n* may include the first optical fiber line 22*n*-1 and the second optical fiber line 22*n*-2 carrying optical signal groups to and from the intermediary ROADM 14*c*, respectively. Further, the second fiber optic line 22*b* may include the first optical fiber line 22*b*-1 and the second optical fiber line 22*b*-2 also carrying optical signals from and to the intermediary ROADM 14*c*, respectively. Additional network elements, not shown in FIG. 3A, may be provided that supply optical signal groups to and receive optical signal groups from the intermediary ROADM 14*c*. Such network elements may comprise a ROADM 14 having the same or similar structure as that of the intermediary ROADM 14*c*, or may comprise an OA 24.

As shown in FIG. 3A, a light sink 64 (described in more detail below in reference to FIG. 3B) and a light source 66 (described in more detail below in reference to FIG. 3C) may be provided and in communication with the intermediary ROADM 14*c* to drop and add optical signal groups, respectively. As further shown in FIG. 3A, the intermediary ROADM 14*c* may include a plurality of WSSs 74, such as WSSs 74*a-f*. Wavelength selective switches are known components that can dynamically route, block and/or attenuate received optical signal groups input from and output to the fiber optic lines 22_a-n_. In addition to transmitting/receiving optical signal groups from these network elements, optical signal groups may also be input from or output to the light source 66 and the light sink 64, respectively.

As further shown in FIG. 3A, each of the WSSs 74_a-f_ can receive optical signal groups and selectively direct such optical signal groups to other WSSs for output from the intermediary ROADM 14_c_. For example, the WSS 74_b_ may receive optical signal groups on the first optical fiber line 22_a_-1 and supply certain optical signal groups to the WSS 74_f_, while others are supplied to the WSS 74_d_. Those supplied to the WSS 74_f_ may be output to a downstream network element, such as the second ROADM 14_b_ (shown in FIG. 1) on the first optical fiber line 22_b_-1, while those supplied to WSS 74_d_ may be output to another network element (e.g., a ROADM 14 and/or an OA 24) (not shown) on the second optical fiber line 22_n_-2. Also, optical signal groups input to the intermediary ROADM 14_c_ on the second optical fiber line 22_b_-2 may be supplied by WSS 74_e_ to either WSS 74_a_ and on to the first ROADM 14_a_ via the second optical fiber line 22_a_-2 or WSS 74_d_ and on to another network element (e.g., a ROADM 14 and/or an OA 24) (not shown) via the second optical fiber line 22_n_-2. Moreover, WSS 74_c_ may selectively direct optical signal groups input to the intermediary ROADM 14_c_ from the first optical fiber line 22_n_-1 to either WSS 74_a_ and onto the first ROADM 14_a_ via the second optical fiber line 22_a_-2 or to WSS 74_f_ and onto the second ROADM 14_b_ via the first optical fiber line 22_b_-1.

WSSs 74_b_, 74_c_, and 74_e_ may also selectively or controllably supply optical signal groups to the light sink 64 and optical signal groups may be selectively output from the light source 66 to the intermediary ROADM 14_c_. The optical signal groups output from the light source 66 may be selectively supplied to one or more of WSSs 74_a_, 74_d_, and 74_f_, for output on to the second optical fiber line 22_a_-2, the second optical fiber line 22_n_-2, and the first optical fiber line 22_b_-1, respectively.

As further shown in FIG. 3A, in some embodiments, the intermediary ROADM 14_c_ further comprises a processor 68 and a memory 70 (i.e., a non-transitory computer readable medium) storing the software applications 54 and the database 58. The processor 68 and the memory 70 may be similar in construction and function as the processor 42 and the memory 50, respectively.

Figure 3B:
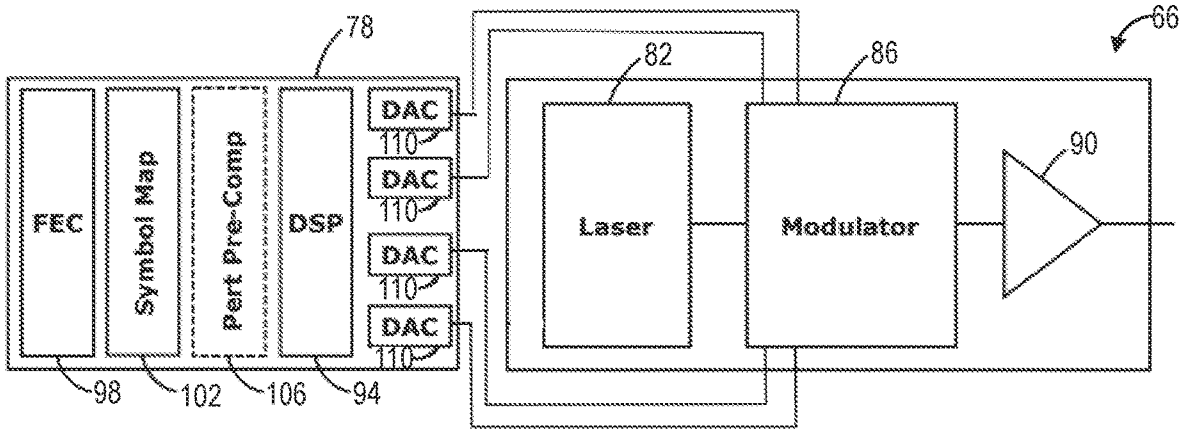
FIG. 3B is a block diagram of a light source shown in FIG. 3A.

Referring now to FIG. 3B, shown therein is an exemplary embodiment of the light source 66 shown in FIG. 3A. The light source 66 may comprise one or more transmitter digital signal processor circuit 78, one or more laser 82, one or more modulator 86, one or more semiconductor optical amplifier 90, and/or other components (not shown). In some embodiments, the light source is a coherent transmitter.

The transmitter digital signal processor circuit 78 may have one or more transmitter digital signal processor (DSP) 94, Transmitter Forward Error Correction (FEC) circuitry 98, Symbol Map circuitry 102, transmitter perturbative pre-compensation circuitry 106, and digital-to-analogue converters (DAC) 110. The transmitter digital signal processor circuit 78 may be located in any one or more components of the light source 66, or separate from the components, and/or in any location(s) among the components. The transmitter digital signal processor circuit 78 may be in the form of one or more Application Specific Integrated Circuit (ASIC), which may contain one or more module and/or custom module.

Processed electrical outputs from the transmitter digital signal processor circuit 78 may be supplied to the modulator 86 for encoding data into optical signals generated and supplied to the modulator 86 from the laser 82. The semiconductor optical amplifier 90 receives, amplifies, and transmits the optical signal including encoded data in the spectrum. Processed electrical outputs from the transmitter digital signal processor circuit 78 may be supplied to other circuitry in the transmitter digital signal processor circuit 78, for example, clock and data modification circuitry. The laser 82, modulator 86, and/or semiconductor optical amplifier 90 may be coupled with a tuning element (e.g., a heater) (not shown) that can be used to tune the wavelength of an optical signal channel output by the laser 82, modulator 86, or semiconductor optical amplifier 90. In some embodiments, a single laser 82 may be shared by multiple light sources 66.

Other possible components in the light source 66 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. Optical transmitters are further described in U.S. Patent Publication No. 2012/0082453, the contents of which is hereby incorporated by reference in its entirety.

Figure 3C:
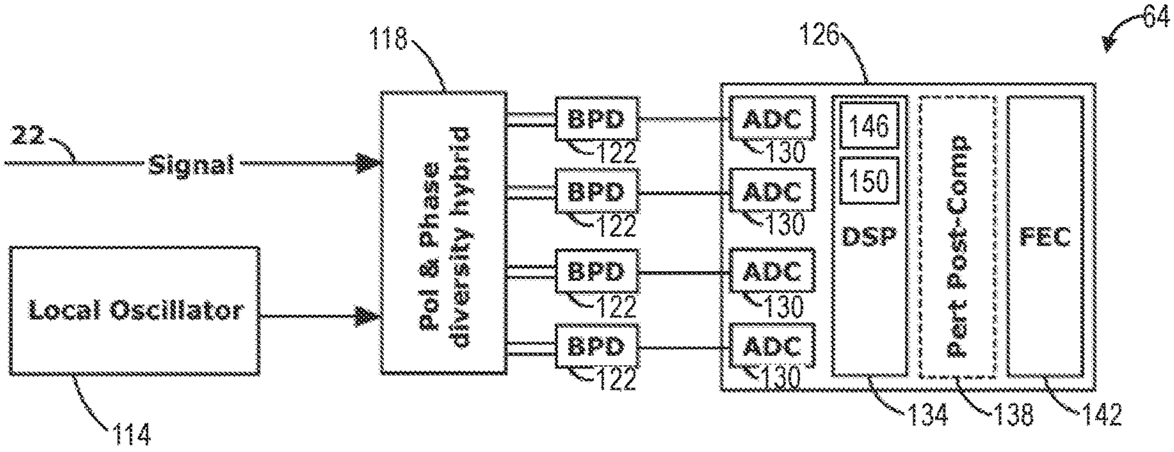
FIG. 3C is a block diagram of a light sink shown in FIG. 3A.

Referring now to FIG. 3C, shown therein is an exemplary embodiment of the light sink 64 shown in FIG. 3A. The light sink 64 may comprise one or more local oscillator 114, a polarization and phase diversity hybrid circuit 118 receiving the one or more channel on the spectrum and the input from the local oscillator 114, one or more balanced photodiode 122 that produces electrical signals representative of the one or more channel on the spectrum, and one or more receiver processor circuit 126. Other possible components in the light sink 64 may include filters, circuit blocks, memory, such as non-transitory memory storing processor executable instructions, additional modulators, splitters, couplers, multiplexers, etc., as is well known in the art. The components may be combined, used, or not used, in multiple combinations or orders. In some embodiments, the light sink 64 is a coherent receiver. The light sink 64 may be implemented in other ways, as is well-known in the art. Exemplary embodiments of the light sink 64 (particularly where the light sink 64 is a coherent receiver) are further described in U.S. patent application Ser. No. 12/052,541, titled "Coherent Optical Receiver".

The one or more receiver processor circuit 126 may comprise one or more analog-to-digital converter (ADC) 130 receiving the electrical signals from the balanced photodiodes 122, one or more receiver digital signal processor (DSP) 134, receiver perturbative post-compensation circuitry 138, and receiver forward error correction (FEC) circuitry 142. The receiver FEC circuitry 142 may apply corrections to the data, as is well-known in the art. The one or more receiver processor circuit 126 and/or the one or more receiver DSP 134 may be located on one or more component of the light sink 64 or separately from the components, and/or in any location(s) among the components. The receiver processor circuit 126 may be in the form of an Application Specific Integrated Circuit (ASIC), which may contain one or more module and/or custom module. In one embodiment, the receiver DSP 134 may include, or be in communication with, one or more processor 146 and one or more memory 150 storing processor readable instructions, such as software, or may be in communication with the processor 42 and the memory 50.

The one or more receiver DSP 134 receives and processes the electrical signals with multi-input-multiple-output (MIMO) circuitry, as described, for example, in U.S. Pat. No. 8,014,686, titled "Polarization demultiplexing optical receiver using polarization oversampling and electronic polarization tracking". Processed electrical outputs from receiver DSP 134 may be supplied to other circuitry in the receiver processor circuit 126, such as the receiver perturbative post-compensation circuitry 138 and the receiver FEC circuitry 142. Various components of the light sink 64 may be provided or integrated, in one example, on a common substrate. Further integration is achieved by incorporating various optical de-multiplexer designs that are relatively compact and conserve space on the surface of the substrate.

In use, the one or more channel of the spectrum may be subjected to optical nonlinear effects between the light source 66 and the light sink 64 such that the spectrum received does not accurately convey carried data in the form that the spectrum was transmitted. The impact of optical nonlinear effects can be partially mitigated by applying perturbative distortion algorithms using one or more of the transmitter perturbative pre-compensation circuitry 106 and the receiver perturbative post-compensation circuitry 138. The amount of perturbation may be calculated using coefficients in algorithms and known or recovered transmitted data. The coefficients may be calculated, in accordance with U.S. Pat. No. 9,154,258 entitled "Subsea Optical Communication System Dual Polarization Idler" the contents of which are hereby incorporated by reference in its entirety, by use of analysis of one or more incoming channel at the light sink 64.

Figure 3D:
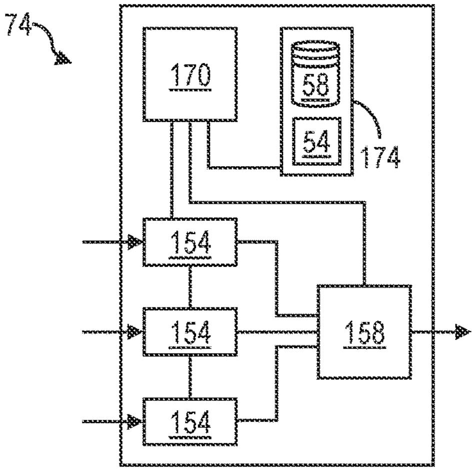
FIG. 3D is a block diagram of a wavelength-selective switch shown in FIG. 3A.

Referring now to FIG. 3D, shown therein is a diagram of the WSS 74 (i.e., any of the WSSs 74*a-f*) shown in FIG. 3A. The WSS 74 may comprise a plurality of tributary ports 154 and a line port 158. Although three tributary ports 154 and one line port 158 are shown in FIG. 3D, persons having ordinary skill in the art will understand that the WSS 74 may have other numbers of tributary ports 154 and line ports 158. The WSS 74 may be operable to receive a plurality of passbands at the tributary ports 154, multiplex the passbands, and transmit the passbands at the line port 158. The WSS 74 in this configuration (i.e., where the tributary ports 154 are inputs and the line port 158 is an output) may be referred to as a multiplexer (MUX) module. Conversely, the WSS 74 also may be operable to receive a plurality of passbands at the line port 158, de-multiplex the passbands, and transmit the passbands at the tributary ports 154. The WSS 74 in this configuration (i.e., where the line port 158 is an input and the tributary ports 154 are outputs) may be referred to as a de-multiplexer (DEMUX) module. In some embodiments, each of the WSSs 74 is further operable to apply variable attenuation for each of the passbands so that power levels may be changed at the outgoing port (i.e., the line port 158 for the MUX modules and the tributary ports 154 for the DEMUX modules) for the passbands.

In some embodiments, each of the WSSs 74 also may be operable to control the attenuation for each of the passbands. Such variable power adjustable functionality may be advantageous to permit flexibility in adapting to changes in the optical characteristics of the transport network 10 (e.g., loss in fiber, equipment aging, optical interference, configuration changes, etc.). Generally, each of the MUX modules and DEMUX modules comprise the same type of optical element (e.g., the WSS 74). However, persons having ordinary skill in the art will understand that the MUX modules and the DEMUX modules may comprise different types of optical elements. The multiplexing and de-multiplexing functionality of the WSSs 74 may be implemented using a variety of technologies, such as LCoS, MEMS arrays, etc.

In some embodiments, the WSS 74 further comprises a processor 170 and a memory 174 storing the software applications 54 and the database 58. The processor 170 and the memory 174 may be similar in construction and function as the processors 42, 68, and the memories 50, 70, respectively.

Figure 4A:
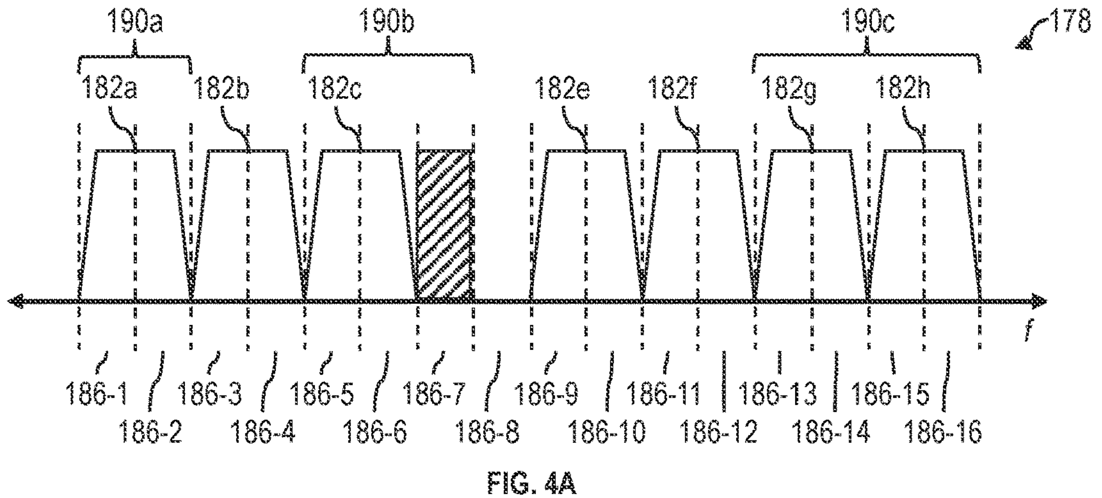
FIG. 4A is a diagram of an exemplary embodiment of a portion of an optical signal constructed in accordance with the present disclosure.

Referring now to FIG. 4A, shown therein is a diagram of an exemplary embodiment of a segment 178 of an optical signal constructed in accordance with the present disclosure. The segment 178 of the optical signal comprises one or more optical channel 182 (shown in FIG. 4A as optical channels 182*a-h*). Each optical channel 182 comprises one or more spectral slice 186 (shown in FIG. 4A as spectral slice 186-1 to spectral slice 186-16). Thus, shown in FIG. 4A, the optical channel 182*a* comprises spectral slice 186-1 and spectral slice 186-2, the optical channel 182*b* comprises spectral slice 186-3 and spectral slice 186-4, continuing on in this manner through the optical channel 182*h* comprising the spectral slice 186-15 and the spectral slice 186-16 (with the exception of optical channel 182*d* as detailed below).

Each spectral slice 186 may represent a predetermined spectrum of a particular size in a frequency band, such that, for example, all spectral slices 186 may be one of 25 GHz, 12.5 GHz, 6.25 GHz, 3.125 GHz, and the like. As shown in FIG. 4A, each spectral slice 186 is a 12.5 GHz spectral slice; therefore, each optical channel 182 is 25 GHz in width and the segment of the optical signal has a bandwidth of 200 GHz. While the segment 178 of the optical signal is shown as having a 200 GHz width, the segment 178 of the optical signal may have a width of about 4.8 THz, for example, resulting in about 384 spectral slices 186 and 192 optical channels 182.

In one embodiment, further shown in FIG. 4A is a first passband 190*a* comprising the spectral slice 186-1 and the spectral slice 186-2; a second passband 190*b* comprising the spectral slice 186-5, the spectral slice 186-6, and the spectral slice 186-7; and a third passband 190*c* comprising the spectral slices 186-13 through 186-16. The first passband 190*a* has a first passband width of 25 GHz (if each slice has a width of 12.5 GHz); the second passband 190*b* has a second passband width of 37.5 GHz; and the third passband 190*c* has a third passband width of 50 GHz. Each optical channel 182, however, has a bandwidth of 25 GHz. Thus, the first passband 190*a* encompasses the optical channel 182*a* with no unused bandwidth difference between the first passband width of the first passband 190*a* and the optical channel 182*a*. The third passband 190*c* encompasses the optical channel 182g and the optical channel 182*h* with no unused bandwidth difference between the third passband width of the third passband 190*c* and a combined bandwidth of the optical channel 182*g* and the optical channel 182*h*. The first passband 190*a* and the third passband 190*c* may thus be said to be fully utilized. The second passband 190*b*, however, encompasses the optical channel 182*c* as well as 12.5 GHz of unused bandwidth (e.g., the size of the spectral slice 186-7 which is encompassed by the second passband 190*b* but not carrying data in an optical channel 182). The second passband 190*b* may thus be said to be fragmented and the spectral slice 186-7 may be referred to as a slice fragment.

Figure 4B:
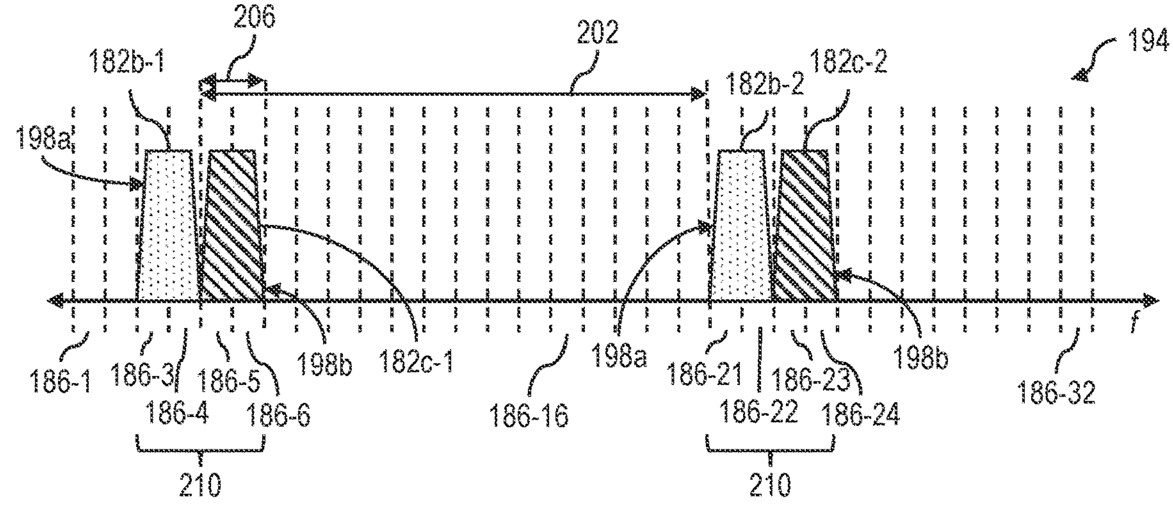
FIG. 4B is a diagram of another exemplary embodiment of a portion of an optical signal constructed in accordance with the present disclosure.

Referring now to FIG. 4B, shown therein shown therein is a partial diagram of an exemplary embodiment of a second segment 194 of the optical signal constructed in accordance with the present disclosure. The second segment 194 of the optical signal is shown with 32 spectral slices 186 (with selected of the spectral slices 186 labeled for simplicity). The second segment 194 encompasses over twice the bandwidth of the segment 178 shown in FIG. 4A.

The second segment 194 is shown with two optical channel groups 198; however, additional ones of the optical channel group 198 may be included in the second segment 194 such that the number of optical channel groups 198 present may be limited by a channel spread 202 and a channel width 206. Each optical channel group 198 is a collection of optical channels 182 having the channel spread 202 (or a multiple of the channel spread 202) between each consecutive optical channel 182. The second segment 194 includes a first optical channel group 198*a* comprising a first optical channel 182*b*-1 and a second optical channel 182*b*-2 and a second optical channel group 198*b* comprising a first optical channel 182*c*-1 and a second optical channel 182*c*-2.

In one embodiment, the channel spread 202 is a distance, in frequency f, between a first optical channel and a second optical channel of a particular one of the optical channel group 198. As shown in FIG. 4B, the first optical channel group 198*a* comprises the first optical channel 182*b*-1 and the second optical channel 182*b*-2 with the channel spread 202 of 16 spectral slices 186, or 200 GHz if each spectral slice 186 has a width of 12.5 GHz.

In one embodiment, the channel width 206 is a bandwidth of a particular one of the optical channel 182, shown in FIG. 4B as the first optical channel 182*c*-1. As shown, the channel width 206 is equal to the width of the spectral slice 186-5 and the spectral slice 186-6. Thus, when the spectral slices 186 have a width of 12.5 GHz, for example, the channel width 206 is 25 GHz.

In one embodiment, each optical channel group 198 comprises 10 optical channels 182. For example, the first optical channel group 198*a* may comprise optical channel 182*b*-1 through optical channel 182*b*-10 (optical channels 182*b*-3 through 182*b*-10 not shown for simplicity).

The WSS 74 may have a preferred passband size, which may be configured to provide optimal optical performance in the network such that the optical channel 182 may be carried end-to-end in the optical network without distortion or loss-of-signal. Where the channel width 206 of the first optical channel 182*b*-1 of the first optical channel group 198*a* is smaller (i.e., has a smaller bandwidth) than the preferred passband size of the WSS 74 (e.g., a 25 GHz bandwidth versus a preferred 37.5 GHz bandwidth), and the first optical channel 182*c*-1 of the second optical channel group 198*b* is adjacent to the first optical channel 182*b*-1 of the first optical channel group 198*a*, the first optical channel group 198*a* and the second optical channel group 198*b* may be referred to as a paired optical channel group 210.

To optimize usage of the optical spectrum (i.e., so as to avoid fragmented slices), the optical channels 182 of the paired optical channel group 210 may be loaded at the same point in time. It is this constraint that causes a difference between the user or logical view of a passband of the paired optical channel group 210 and the device or physical view of the passband which is actually configured in the WSS 74. Where the user determines to load, for example, the first optical channel 182*b*-1 of the first optical channel group 198*a*, the first optical channel 182*b*-1 of the first optical channel group 198*a* may be referred to as a user-view or logical-view passband (i.e., a passband which the user intends to load). However, because both of the optical channels 182 of the paired optical channel group 210 must be loaded in at the same time due to the preferred passband size in the WSS 74, the first optical channel 182*b*-1 of the first optical channel group 198*a* and the first optical channel 182*c*-1 of the second optical channel group 198*b* may be collectively referred to as a device-view or physical-view passband (i.e., a passband which is actually loaded on the WSS 74). Where the first optical channel 182*b*-1 and the first optical channel 182*c*-1 are collectively referred to as a physical-view passband, each of the first optical channel 182*b*-1 and the first optical channel 182*c*-1 may be referred to as a physical-view partition or simply as a partition. While the physical-view passbands are described herein as comprising two partitions, more or less than two partitions may be contained in a physical-view passband; the number of partitions may depend on the channel spread 202, the channel width 206, and/or the preferred size of the passband of the WSS 74.

Because the channel spread 202 is the same between the optical channels 182 of the first optical channel group 198*a* and the second optical channel group 198*b*, if the first optical channel 182*b*-1 and the first optical channel 182*c*-1 are adjacent one another in the optical spectrum, each optical channel 182*b* at a first channel index of the first optical channel group 198*a* will be adjacent a respective optical channel 182*c* at the first channel index of the second optical channel group 198*b* such that the xth optical channel 182*b*-*x* of the first optical channel group 198*a* is adjacent the xth optical channel 182*c*-*x* of the second optical channel group 198*b*, where x is the channel index of the optical channel 182 within the optical channel group 198.

Figure 5:
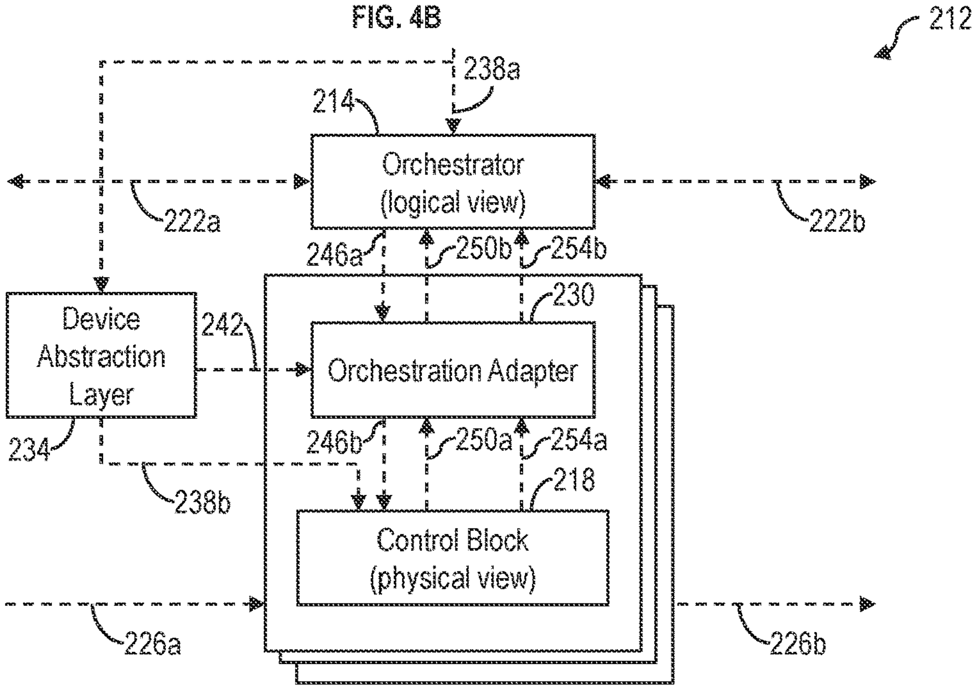
FIG. 5 is a block diagram of an exemplary embodiment of a software system constructed in accordance with the present disclosure.

Referring now to FIG. 5, shown therein is a diagram of a software system 212 constructed in accordance with the present disclosure. In some embodiments, as shown in FIG. 5, the software system 212 comprises the software applications 54 shown in FIGS. 2, 3A, and 3D, each of the software applications 54 being operable to perform an action such as communicate with or control one or more component of the computer system 26, the transport network 10 (e.g., the network elements 14) and/or the communication network 30.

In particular, the software applications 54 may comprise an orchestrator application 214 (hereinafter, the "orchestrator 214") and one or more optical power control loop 218 (hereinafter, the "control block 218") may be operable to control one or more optical power control-related configuration of the transport network 10 (e.g., the network elements 14) (i.e., by adjusting one or more attenuation level and/or one or more gain associated with the network elements 14) such that a target optical power level is maintained within a tolerance level of optimal levels all of the time. Maintaining such a target optical power level may have the effect of guaranteeing that receiving equipment (i.e., one of the network elements 14) receives a higher-quality signal with a good Signal-to-Noise Ratio (SNR) and with minimal distortion. In some embodiments, the orchestrator 214 is operable to control one or more optical power control-related configuration of the network elements 14 and/or the control block 218 thereof. Exemplary orchestrators 214 may include, for example, the Service and Power Control Orchestrator disclosed in U.S. Patent Application No. 63/305,779, which is incorporated herein by reference.

The control block 218 may comprise at least one of a MUX control block 218 operable to control one or more optical power control-related configuration of a MUX module (i.e., a WSS 74 in the configuration where the tributary ports 154 are inputs and the line port 158 is an output), a DEMUX control block 218 operable to control one or more optical power control-related configuration of a DEMUX module (i.e., a WSS 74 in the configuration where the line port 158 is an input and the tributary ports 154 are outputs), and/or a line amplifier or link control block 218 operable to control one or more optical power control-related configuration of one or more OA 24 in the transport network 10. The MUX control block 218 may adjust one or more passband configuration and/or one or more attenuation of the MUX modules. Such adjustments may be made by the MUX control block 218 on a per-passband basis. The DEMUX control block 218 may adjust one or more passband configuration and/or one or more attenuation of the DEMUX module. Such adjustments may be made by the DEMUX control block 218 on a per-passband basis. In some embodiments, the functions of the MUX control block 218 and the DEMUX control block 218 may be performed by a single WSS control block 218. The link control block 218 may adjust one or more configuration, one or more attenuation, and/or one or more gain for the OAs 24 in the transport network 10. Such adjustments may be made on a per-band basis (i.e., the C-band, the L-band, or C/L-band).

In some embodiments, particularly in those embodiments in which the transport network 10 comprises a plurality of distributed orchestrators 214, the orchestrator 214 may receive upstream orchestration messages **222*a* from an upstream orchestrator 214 and may transmit downstream orchestration messages 222*b* to a downstream orchestrator 214. Similarly, the control block 218 may receive upstream controls data 226*a* from the control block 218 of an upstream network element 14 and may transmit downstream controls data 226*b* to the control block 218 of a downstream network element 14**.

Further, as presently described herein, the software applications 54 of the software system 212 may further comprise an orchestration adapter 230 and a device abstraction layer 234 for communicating between the orchestrator 214 (i.e., operating on the logical view) and the control block 218 (i.e., operating on the physical view). Accordingly, the device abstraction layer 234 and the orchestrator 214 may receive a logical-view passband configuration **238*a* from, for example, the computer system 26 or the user system (not shown). The device abstraction layer 234 may use, for example, the logical-view passband configuration 238*a* to generate and transmit a physical-view passband configuration 238*b* to the control block 218. Having received the logical-view passband configuration 238*a* and generated the physical-view passband configuration 238*b*, the device abstraction layer 234 may then generate a mapping 242 (to be discussed in more detail in reference to FIGS. 6A and 6B) indicative of a correspondence between the logical-view passband configuration 238*a* and the physical-view passband configuration 238*b* and transmit the mapping 242 to the orchestration adapter 230**. Exemplary device abstraction layers may include, for example, the Passband Abstraction Layer described in U.S. Pat. No. 9,973,294, which is incorporated herein by reference.

In use, the orchestrator 214 may transmit a logical-view operation request **246*a* to the orchestration adapter 230. The orchestration adapter 230 may then transmit a physical-view operation request 246*b* to the control block 218, wherein the conversion from the logical-view operation request 246*a* to the physical-view operation request 246*b* is based at least in part on the mapping 242. Each of the logical-view operation request 246*a* and the physical-view operation request 246*b* may identify an operation and one or more passband, the passband being associated with the operation. As will be discussed in more detail below, the orchestrator 214 may also transmit a composite logical-view operation request 246*a* to the orchestration adapter 230, which the orchestration adapter 230 may decompose into a plurality of primitive physical-view operation requests 246*b* to transmit to the control block 218. The control block 218 may transmit a physical-view operation response 250*a* and/or a physical-view state update 254*a* to the orchestration adapter 230. The orchestration adapter 230 may then transmit a logical-view operation response 250*b* and/or a logical-view state update message 254*b* to the orchestrator 214**.

Referring now to FIG. 6A, the mapping 242 may comprise, for example, an orchestrator-to-control block table **255*a* (hereinafter, the "O2C Table 255*a*") for translating between the logical-view passbands and the physical-view passbands. The O2C Table 255*a* may have stored therein partition entries 256*a* for each of the partitions (i.e., one entry for each partition stored). The O2C Table 255*a* may comprise a "PN-Sf, PN-Ef" column in which are stored a start frequency and an end frequency for each of the partition entries 256*a*. The O2C Table 255*a* may further comprise a "PbKey" column, an "OrchIntent" column, and a "ProvIntent" column in which are respectively stored a passband key, an orchestration intent, and a provisioning intent for each partition. The passband key may be a unique identifier identifying the physical-view passband which includes the particular partition, the orchestration intent may be one of "DEACTIVATE" and "ACTIVATE" based on the most recent operation request 246 transmitted by the orchestrator 214 to the control block 218**, and the provisioning intent may be one of "PROVISIONED" or "UNPROVISIONED" based on whether the logical-view passband corresponding to the partition has been provisioned by the user or not. The default value of the orchestration intent may be "DEACTIVATE", and the default value of the provisioning intent may be "UNPROVISIONED".

The orchestration adapter 230 may, for example, look up the start frequency and the end frequency of a logical-view passband (i.e., a partition) in the O2C Table **255*a*** to determine a passband key for the corresponding physical-view passband, an orchestration intent for the logical-view passband, and/or a provisioning intent for the logical-view passband.

Referring now to FIG. 6B, the mapping 242 may further comprise, for example, a control block-to-orchestrator table **255*b* (hereinafter, the "C2O Table 255*b*") for translating between the physical-view passbands and the logical-view passbands. The C2O Table may have stored therein passband entries 256*b* for each of the physical-view passbands stored by, for example, the control block 218**.

In some embodiments, the passband entries **256*b* are stored in the database 58 or otherwise in one or more of the memories 50, 70, and 174. Each of the passband entries 256*b* may include, for example, a passband key, a start frequency, and either an end frequency or a bandwidth. The passband key may be data indicative of a particular passband which may be configured on a particular one of the WSSs 74. For example, if the passband entry 256*b* is stored in the memory 50 or, for example, in the memory 70, the passband entry 256*b* may further include a WSS identifier to indicate which WSS 74** the passband is to be implemented on.

The C2O Table may comprise a "PbKey" column in which is stored the passband key for each physical-view passband. The C2O Table may further comprise a "List<(PN-Sf, PN-Ef)>" column in which is stored a partition list for each of the physical-view passbands stored by the control block 218, the partition list of each physical-view passband comprising a start frequency and an end frequency for each partition corresponding to the particular physical-view passband.

The orchestration adapter 230 may, for example, look up the passband key of a physical-view passband to determine a partition list for the physical-view passband, and therefore, the start frequency and end frequency for each of the logical-view passbands corresponding to the physical-view passband.

Figure 7A:
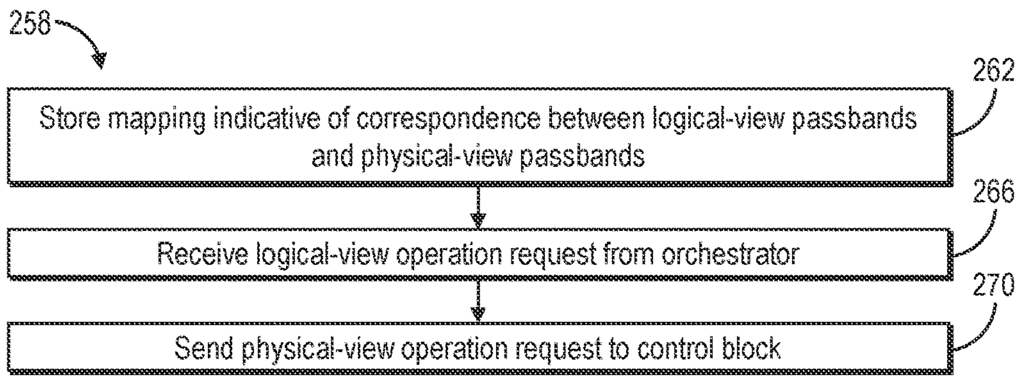
FIG. 7A is a process flow diagram of a method of adapting between a logical view and a physical view according to the present disclosure.

Referring now to FIG. 7A, shown therein is a process flow diagram of an exemplary embodiment of a method 258 for adapting between a logical view and a physical view according to the present disclosure. The method 258 may be performed by, for example, one of the processors 42, 68, and 170 executing the processor-executable instructions of the software applications 54. As shown in FIG. 7A, the method 258 may generally comprise the steps of: storing a mapping 242 indicative of a correspondence between a plurality of logical-view passbands and a plurality of physical-view passbands (step 262); receiving a logical-view operation request 246*a* from an orchestrator 214 of a network element 14 in a transport network 10 (step 266); and sending a physical-view operation request 246*b* to the control block 218 (step 270).

As described above, the processor-executable instructions of the software applications 54 may be stored separate from the orchestrator 214 and the control block 218 (e.g., in the memory 50). As shown in FIGS. 6A and 6B, the mapping 242 may be further indicative of a correspondence between a frequency range of each of the logical-view passbands and a unique identifier (i.e., "PbKey") of each of the physical-view passbands, the frequency range of each of the plurality of logical-view passbands being defined by a start frequency (i.e., "PN-Sf") and an end frequency (i.e., "PN-Ef").

The logical-view operation request 246*a* may identify a first operation and a first logical-view passband. The first logical-view passband may be associated with the first operation (i.e., the first operation is to be performed on the first logical-view passband). The first operation may be executable by the control block 218, which may control a WSS 74. The first operation may be, for example, an activation of an optical service on a fiber optic line 22 of the transport network 10, a deactivation of an optical service on a fiber optic line 22 of the transport network 10, a reservation of the ROADM 14 (i.e., a control block 218 of the ROADM 14) for the activation of the optical service, a release of the ROADM 14 (i.e., the control block 218 of the ROADM 14) from such a reservation, and an adjustment of a configuration of the ROADM 14 (i.e., the control block 218 of the ROADM 14).

In some embodiments, prior to sending the physical-view operation request 246*b* to the control block 218 (step 270), the orchestration adapter 230 may first determine whether the first logical-view passband has been provisioned by a user. In such embodiments, the orchestration adapter 230 may send the physical-view operation request 246*b* to the control block 218 (step 270) responsive to a determination that the first logical-view passband has been provisioned by a user.

The physical-view operation request 246*b* may comprise instructions to cause the control block 218 to execute the first operation. As described above, each of the physical-view passbands may comprise one or more partition, each of the one or more partition corresponding to a particular logical-view passband. The instructions may identify the first operation and a first physical-view passband, wherein a first partition of the first physical-view passband may correspond to the first logical-view passband. Further, a second partition of the first physical-view passband may correspond to a second logical-view passband.

Figure 7B:
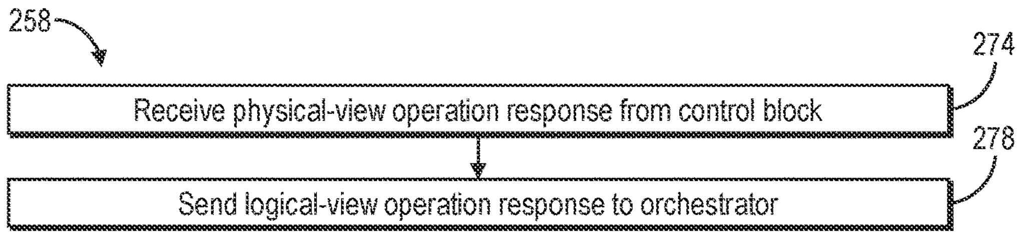
FIG. 7B is a process flow diagram of additional steps of the method shown in FIG. 7A that are performed in some embodiments.

Referring now to FIG. 7B, shown therein are additional steps of the method 258 shown in FIG. 7A which are performed in some embodiments. As shown in FIG. 7B, the method 258 may further comprise the steps of: receiving a physical-view operation response 250*a* from the control block 218 (step 274); and sending a logical-view operation response 250*b* to the orchestrator 214 (step 278). The physical-view operation response 250*a* may identify the first physical-view passband and may be indicative of one of a success and a failure of executing the first operation. Similarly, the logical-view operation response may identify the first logical-view passband and may be indicative of one of a success and a failure of executing the first operation.

In some embodiments, the logical-view operation request 246*a* is a composite logical-view operation request 246*a*; that is, the composite logical-view operation request 246*a* may further identify a second operation and a second logical-view passband. In such a situation, in addition to translating the composite logical-view operation request 246*a*, the orchestration adapter 230 may be operable to decompose the composite logical-view operation request 246*a*, thereby generating at least a first logical-view operation request 246*a* and a second logical-view operation request 246*a*. In some embodiments, the orchestration adapter 230 may receive the first logical-view operation request 246*a* and the second logical-view operation request 246*a* separately, rather than as a composite logical-view operation request 246*a*.

Where the orchestration adapter 230 is provided with the first logical-view operation request 246*a* and the second logical-view operation request 246*a*, whether together as a composite request or as separate primitive requests, the orchestration adapter 230 may determine not to send both the first physical-view operation request 246*b* and the second physical-view operation request 246*b* to the control block 218.

If the first logical-view passband and the second logical-view passband correspond to the same physical-view passband (i.e., a first partition of the first physical-view passband corresponds to the first logical-view passband and a second partition of the first physical-view passband corresponds to the second logical-view passband), then it will not be necessary to send the second physical-view operation request 246*b* to the control block 218. Because activating the first logical-view passband requires activating both partitions of the first physical-view passband, the second partition corresponding to the second logical-view passband will be activated upon completion of the first operation itself.

Therefore, upon receiving a first physical-view operation response 250*a* indicative of a success of the first operation, rather than sending the second physical-view operation request 246*b* to the control block 218 unnecessarily, the orchestration adapter 230 may simply send a logical-view operation response 250*b* to the orchestrator, the logical-view operation response 250*b* identifying the first logical-view passband and the second logical-view passband and being indicative of a success of executing the first operation and a success of executing the second operation.

However, upon receiving a first physical-view operation response 250*a* indicative of a failure of the first operation, the orchestration adapter 230 may then send the second physical-view operation request 246*b* to the control block 218. The second physical-view operation request 246*b* may identify the second operation and the first physical-view passband. The orchestration adapter 230 may then receive a second physical-view operation response 250*a* from the control block 218. The second physical-view operation response 250*a* may identify the first physical-view passband and may be indicative of one of a success and a failure of executing the second operation. The orchestration adapter 230 may then send a second logical-view operation response 250*b* to the orchestrator 214. The second logical-view operation response 250*b* may identify the first logical-view passband and the second logical-view passband, and may be indicative of one of a success and a failure of executing the second operation.

If the first logical-view passband and the second logical-view passband correspond to different physical-view passbands (i.e., a first partition of the first physical-view passband corresponds to the first logical-view passband and a second partition of a second physical-view passband corresponds to the second logical-view passband), then it will be necessary to send the second physical-view operation request 246*b* to the control block 218. Accordingly, the orchestration adapter 230 may be operable to send the second physical-view operation request 246*b* to the control block 218. The second physical-view operation request 246*b* may comprise second instructions to cause the control block 218 to execute the second operation, the second instructions identifying the second operation and the second physical-view passband.

In this case, the orchestration adapter 230 may receive a first physical-view operation response 250*a* and a second physical-view operation response 250*a* from the control block 218 (i.e., one for each of the first operation and the second operation). The first physical-view operation response 250*a* may identify the first physical-view passband and may be indicative of one of a success and a failure of executing the first operation. Similarly, the second physical-view operation response 250*a* may identify the second physical-view passband and may be indicative of one of a success and a failure of executing the second operation. However, rather than sending two separate logical-view operation responses 250*b* to the orchestrator 214, the orchestration adapter 230 may be operable to send a composite logical-view operation response 250*b* to the orchestrator 214. The composite logical-view operation response 250*b* may identify both the first logical-view passband and the second logical-view passband, and may be indicative of one of a success and a failure of executing the first operation and the second operation.

In some embodiments, the method 258 further comprises receiving a third logical-view operation request 246*a* from the orchestrator 214. The third logical-view operation request 246*a* may identify a third operation and a first particular logical-view passband of the first logical-view passband and the second logical-view passband (i.e., one of the logical-view passbands corresponding to the activated physical-view passband). The third operation may be a deactivation of a first particular optical service of the first optical service and the second optical service (i.e., one of the optical services corresponding to the activated physical-view passband).

Where the first logical-view passband and the second logical-view passband correspond to different physical-view passbands, the method 258 may further comprise sending a third physical-view operation request 246*a* to the control block 218. The third physical-view operation request 246*a* may comprise third instructions to cause the control block 218 to execute the third operation. The third instructions may identify the third operation and the particular physical-view passband (i.e., a particular physical-view passband of the first physical-view passband and the second physical-view passband) corresponding to the first particular logical-view passband (i.e., a particular partition of the first partition and the second partition corresponds to the first particular logical-view passband, wherein the particular physical-view passband comprising the particular partition.).

However, where the first logical-view passband and the second logical-view passband correspond to the same physical-view passband, because only one of the first logical-view passband and the second logical-view passband is to be deactivated, it would be incorrect to send a physical-view operation request 246*b* to the control block 218, which would have the effect of deactivating the activated physical-view passband, thereby deactivating both of the first logical-view passband and the second logical-view passband. Therefore, responsive to a particular partition of the first partition and the second partition corresponding to the first particular logical-view passband (i.e., the logical-view passband the user requested to deactivate), the method 258 may instead comprise sending a second logical-view operation response 250*b* to the orchestrator 214. The second logical-view operation response 250*b* may identify the first particular logical-view passband, and may be indicative of a success of executing the third operation, thereby indicating to the orchestrator 214 and/or the user that the first logical-view passband has been deactivated, even though the physical-view passband is still activated in the WSS 74.

In some embodiments, the method 258 further comprises receiving a fourth logical-view operation request 246*a* from the orchestrator 214. The fourth logical-view operation request 246*a* may identify a fourth operation and a second particular logical-view passband of the first logical-view passband and the second logical-view passband (i.e., the other logical-view passband). The fourth operation may be a deactivation of a second particular one of the first optical service and the second optical service (i.e., the other optical service). Now, from the point of view of the user, the first particular logical-view passband has been deactivated, and only the second particular logical-view passband is activated. However, from the point of view of the WSS 74, both of the first particular logical-view passband and the second particular logical-view passband are activated. Accordingly, responsive to a second particular partition of the first partition and the second partition corresponding to the second particular logical-view passband, the method 258 may further comprise sending a second physical-view operation request 246*b* to the control block 218. The second physical-view operation request 246*b* may comprise second instructions to cause the control block 218 to execute the fourth operation. The second instructions may identify the fourth operation and the first physical-view passband.

Figure 7C:
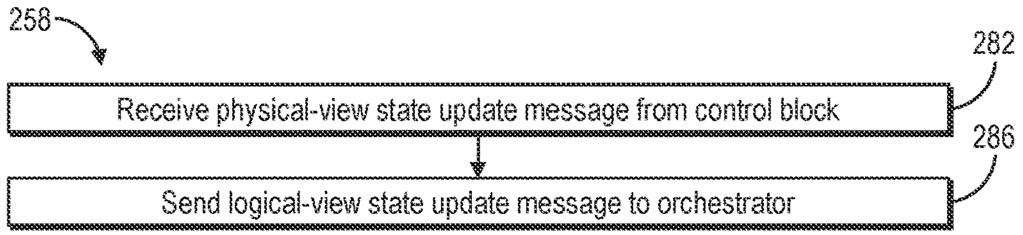
FIG. 7C is another process flow diagram of additional steps of the method shown in FIGS. 7A and 7B that are performed in some embodiments.

Referring now to FIG. 7C, shown therein are additional steps of the method 258 shown in FIG. 7A which are performed in some embodiments. As shown in FIG. 7C, the method 258 may further comprise the steps of: receiving a physical-view state update message 254*a* from the control block 218 (step 282); and sending a logical-view state update message 254*b* to the orchestrator 214 (step 286). The physical-view state update message 254*a* may identify a state update and a physical-view passband, wherein the state update is associated with the identified physical-view passband. Accordingly, the logical-view state update message 254*b* may identify a logical-view passband corresponding to one of the partitions of the physical-view passband and may be indicative of the state update. In some embodiments, the method 258 may further comprise, prior to sending the logical-view state update message 254*b* to the orchestrator 214 (step 286), determining whether the identified logical-view passband has been provisioned by the user, and, responsive to the determination that the identified logical-view passband has been provisioned by the user, sending the logical-view state update message 254*b* to the orchestrator 214 (step 286).

The state update may comprise, for example, an "ACTIVATED" state update, a "DEACTIVATED" state update, a "READY" state update, a "FAULTED" state update, and/or a "SHUTDOWN" state update.

In some embodiments, a composite logical-view operation request 246*a* may comprise a plurality of logical-view operation requests 246*a* wherein each of the logical-view operation requests 246*a* comprises an ordinal identifier. Such a composite logical-view operation request 246*a* may be referred to as a "multi-order" logical-view operation request 246*a*. The "multi-order" logical-view operation request 246*a* may further comprise any number of xth-order logical-view operation requests 246*a*. In such embodiments, the method 258 may comprise the steps of: receiving the "multi-order" logical-view operation request 246*a* from the orchestrator 214 (step 266); for each of the first-order logical-view operation requests 246*a* in sequence, sending a first-order physical-view operation request 246*b* to the control block 218 (step 270); receiving a first-order physical-view state update message 254*a* for one or more of the first-order physical-view operation requests 246*b* from the control block 218 (step 282); sending a first-order logical-view state update message 254*b* for each of the first-order physical-view state update messages 254*a* to the orchestrator 214 (step 286); receiving a first-order physical-view operation response 250*a* for each of the first-order physical-view operation requests 246*b* from the control block 218 (step 274); for each of the xth-order logical-view operation requests 246*a* in sequence, sending an xth-order physical-view operation request 246*b* to the control block 218 (step 270); receiving an xth-order physical-view state update message 254*a* for one or more of the xth-order physical-view operation requests 246*b* from the control block 218 (step 282); sending an xth-order logical-view state update message 254*b* for each of the xth-order physical-view state update messages 254*a* to the orchestrator 214 (step 286); receiving an xth-order physical-view operation response 250*a* for each of the xth-order physical-view operation requests 246*b* from the control block 218 (step 274); and sending a composite logical-view operation response 250*b* corresponding to the first-order physical-view operation responses 250*a* and the xth-order physical-view operation responses 250*a* to the orchestrator (step 278).

The sequence in which the multi-order physical-view operation requests 246*b* are sent may be based at least in part on the ordinal identifiers. In some embodiments, the sequence is based on an ascending order of the ordinal identifiers (i.e., first-order to xth-order). However, in other embodiments, the sequence is based on a descending order of the ordinal identifiers (i.e., xth-order to first-order).

Figure 8A:
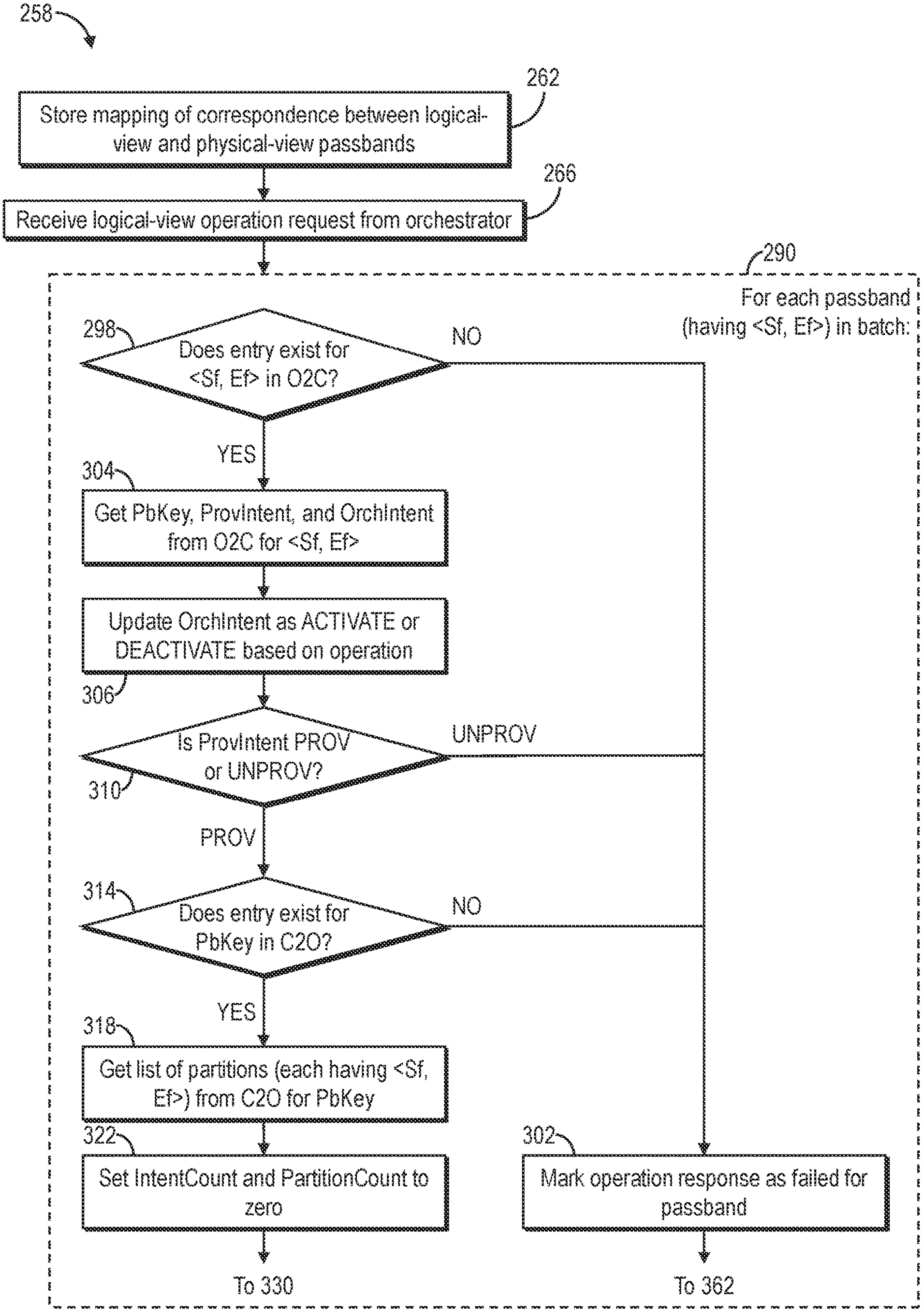
FIG. 8A is another process flow diagram of additional steps of the method shown in FIGS. 7A and 7B that are performed in some embodiments.

Referring now to FIG. 8A, shown therein is a process flow diagram of another exemplary embodiment of the method 258 shown in FIGS. 7A and 7B illustrating a reference-counting aspect of the present disclosure. The method 258 may comprise the preliminary steps of: storing the mapping 242 indicative of the correspondence between the plurality of logical-view passbands and the plurality of physical-view passbands (step 262); and receiving the logical-view operation request 246*a* from the orchestrator 214 (step 266). As further shown in FIG. 8A, the method 258 may further comprise an outer "for" loop 290 wherein the steps of the method 258 contained within the outer "for" loop 290 are repeated for each logical-view passband identified by the logical-view operation request 246*a*, each of the identified logical-view passbands having a start frequency and an end frequency.

It should be noted that, for the sake of clarity in describing the reference-counting logic, it is assumed that, for each logical-view passband in the batch of logical-view passbands of the logical-view operation request 246*a*, only a first partition of the associated physical-view passband is associated with a logical-view passband in the batch, and a second partition of the associated physical-view passband is associated with a logical-view passband that is not in the batch of logical-view passbands of the logical-view operation request 246*a*. Additionally, the logical-view operation request 246*a* is assumed to be a single-order logical-view operation request 246*a*. It will be understood by persons having ordinary skill in the art that a more complicated logic may be designed for a more generalized case of a batch comprising logical-view passbands associated with each partition of a physical-view passband in a multi-order logical-view operation request 246*a* without deviating from the present disclosure.

The outer "for" loop 290 may comprise the steps of: determining whether a partition entry 256*a* exists for the identified logical-view passband in the O2C Table 255*a* based at least in part on the start frequency and the end frequency (step 298); if no partition entry 256*a* exists for the identified logical-view passband in the O2C Table 255*a*, marking a logical-view operation response 250*b* for the passband as being indicative of a failure of executing the operation (step 302); if a partition entry 256*a* does exist for the identified logical-view passband in the O2C Table 255*a*, retrieving the passband key, the provisioning intent, and the orchestration intent from the O2C Table 255*a* for the identified logical-view passband (step 304); and updating the orchestration intent for the identified logical-view passband as ACTIVATE or DEACTIVATE based at least in part on the operation identified by the logical-view operation request 246*a* (step 306).

The outer "for" loop 290 may further comprise the steps of: determining whether the provisioning intent for the identified logical-view passband is PROVISIONED or UNPROVISIONED based at least in part on the partition entry 256*a* for the identified logical-view passband (step 310); if the provisioning intent for the identified logical-view passband is UNPROVISIONED, marking the logical-view operation response 250*b* for the passband as being indicative of a failure of executing the operation (step 302); if the provisioning intent for the identified logical-view passband is PROVISIONED, determining whether a passband entry 256*b* exists for the identified logical-view passband in the C2O Table based at least in part on the passband key (step 314); if no passband entry 256*b* exists for the identified logical-view passband in the C2O Table, marking the logical-view operation response 250*b* for the passband as being indicative of a failure of executing the operation (step 302); if a passband entry 256*b* does exist for the identified logical-view passband in the C2O Table, retrieving the partition list for the passband entry 256*b* from the C2O Table (step 318); and setting an intent count and a partition count each to zero (step 322). The intent count and the partition count may be integer variables for the purposes of the method 258.

Figure 8B:
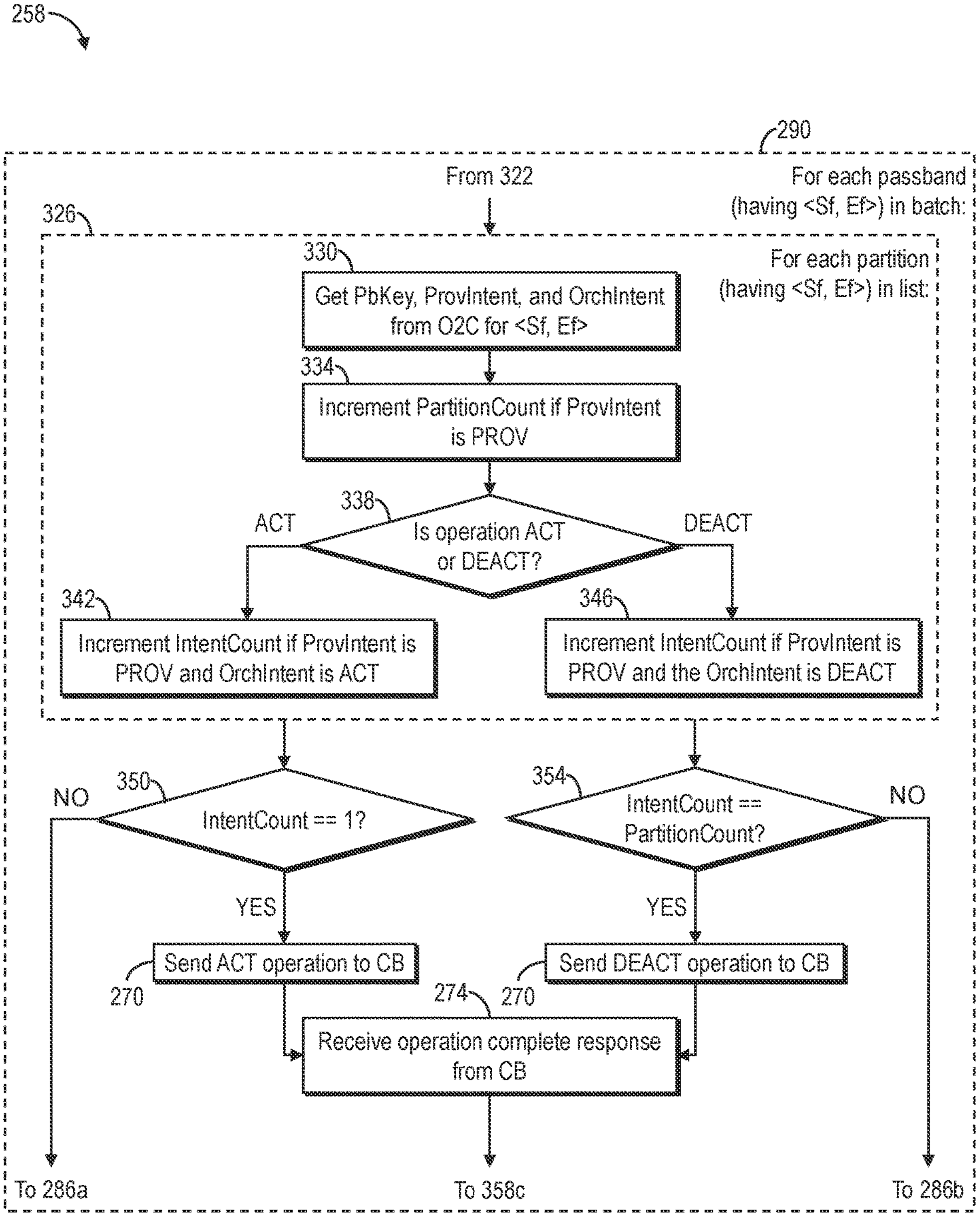
FIG. 8B is another process flow diagram of additional steps of the method shown in FIGS. 7A and 7B that are performed in some embodiments.

Referring now to FIG. 8B, shown therein are additional steps of the method 258 shown in FIG. 8A which are performed in some embodiments. As shown in FIG. 8B, the method 258 may further comprise an inner "for" loop 326 within the outer "for" loop 290 described above, wherein the steps of the method 258 contained within the inner "for" loop 326 are repeated for each partition in the partition list for the identified logical-view passband, each of the identified partitions having a start frequency and an end frequency.

The inner "for" loop 326 may comprise the steps of: retrieving the passband key, the provisioning intent, and the orchestration intent for the identified partition from the O2C Table 255*a* (step 330); incrementing the partition count by one if the provisioning intent for the identified partition is PROVISIONED (step 334); determining whether the operation is an activation or a deactivation of an optical service (step 338); if the operation is an activation of an optical service, and further if the provisioning intent for the identified partition is PROVISIONED and the orchestration intent for the identified partition is ACTIVATE, increment the intent count by one (step 342); and if the operation is a deactivation of an optical service, and further if the provisioning intent for the identified partition is PROVISIONED and the orchestration intent for the identified partition is DEACTIVATE, increment the intent count by one (step 346).

Figure 8C:
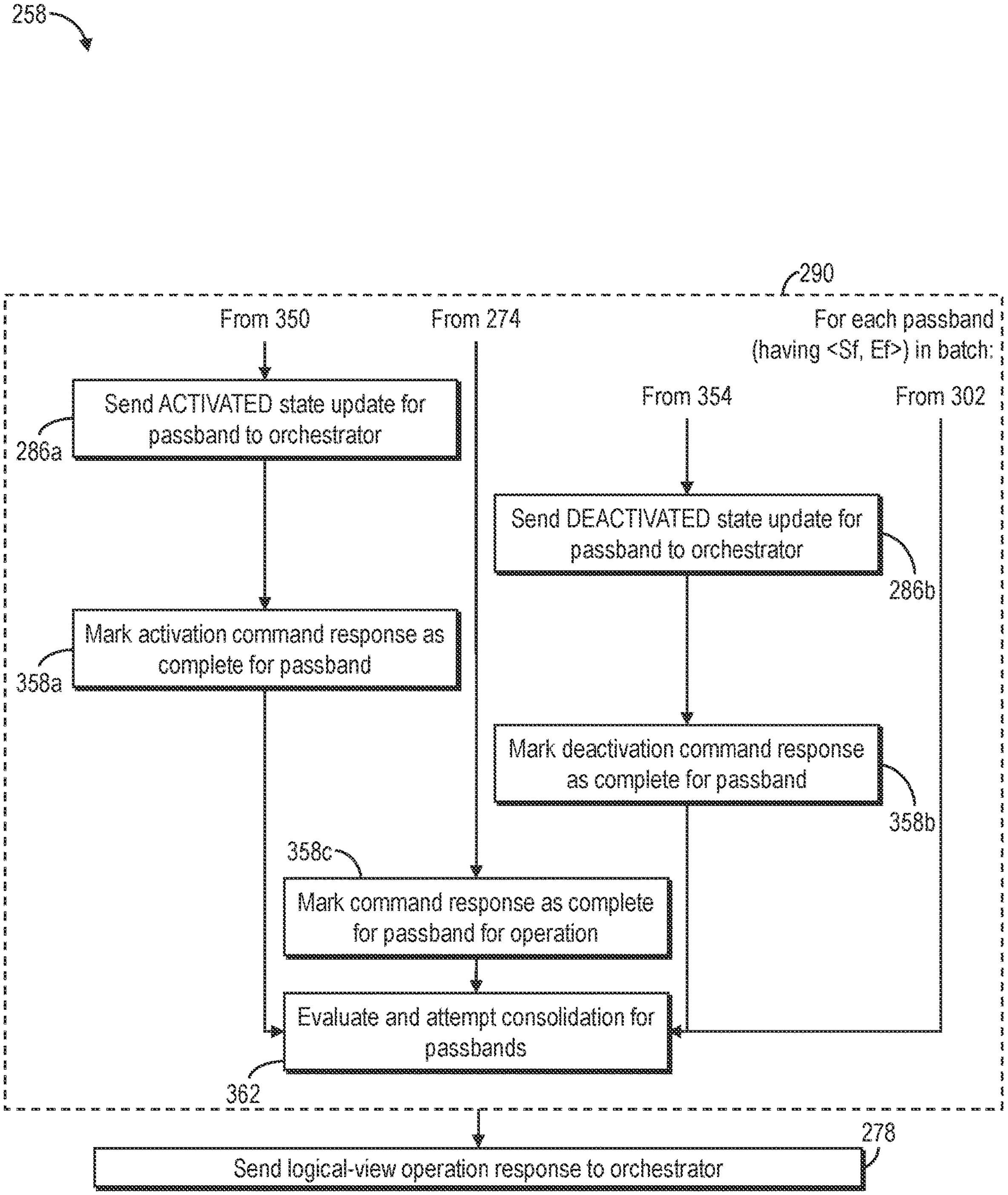
FIG. 8C is another process flow diagram of additional steps of the method shown in FIGS. 7A and 7B that are performed in some embodiments.

As further shown in FIG. 8B, after completion of the inner "for" loop 326, the outer "for" loop 290, if the operation is an activation of an optical service, may further comprise the steps of: determining whether the intent count is equal to one (step 350); if the intent count is equal to one, sending the physical-view operation request 246*b* to the control block 218 (step 270); and receiving the physical-view operation response 250*a* from the control block 218 (step 274); and if the intent count is not equal to one, sending a first logical-view state update message 254*b* to the orchestrator 214 (step 286*a*) (shown in FIG. 8C). The first logical-view state update message 254*b* may indicate that the state of the identified logical-view passband is ACTIVATED.

As further shown in FIG. 8B, after completion of the inner "for" loop 326, the outer "for" loop 290, if the operation is a deactivation of an optical service, may further comprise the steps of: determining whether the intent count is equal to the partition count (step 354); if the intent count is equal to the partition count, sending the physical-view operation request 246*b* to the control block 218 (step 270); and receiving the physical-view operation response 250*a* from the control block 218 (step 274); and if the intent count is not equal to the partition count, sending a second logical-view state update message 254*b* to the orchestrator 214 (step 286*b*) (shown in FIG. 8C). The second logical-view state update message 254*b* may indicate that the state of the identified logical-view passband is DEACTIVATED.

Referring now to FIG. 8C, shown therein are additional steps of the method 258 shown in FIG. 8A which are performed in some embodiments. As shown in FIG. 8C, the outer "for" loop 290 may further comprise the step of: subsequent to sending the first logical-view state update message 254*b* to the orchestrator 214 (step 286*a*), marking the logical-view operation response 250*b* for the passband as being indicative of a success of executing the operation (step 358*a*), the operation being the activation of the optical service. Alternatively, the outer "for" loop 290 may further comprise the step of: subsequent to sending the second logical-view state update message 254*b* to the orchestrator 214 (step 286*b*), marking the logical-view operation response 250*b* for the passband as being indicative of a success of executing the operation (step 358*b*), the operation being the deactivation of the optical service. Alternatively, the outer "for" loop 290 may further comprise the step of: subsequent to receiving the physical-view operation response 250*a* from the control block 218 (step 274), marking the logical-view operation response 250*b* for the passband as being indicative of a success of executing the operation (step 358*c*), the operation being one of the activation and the deactivation of the optical service.

As further shown in FIG. 8C, the outer "for" loop 290 may further comprise the step of: evaluating and attempting consolidation of the logical-view operation responses 250*b* for the passbands which have already been operated on (step 362) in order to generate a composite logical-view operation response 250*b*. The step of evaluating and attempting consolidation of the logical-view operation responses 250*b* for the passbands which have already been operated on (step 362) may be subsequent to the steps of: marking the logical-view operation response 250*b* for the passband as being indicative of a success or failure of executing the operation (step 358*a*, 358*b*, and 358*c*); or marking the logical-view operation response 250*b* for the passband as being indicative of a failure of executing the operation (step 302). After completing the outer "for" loop 290, the composite logical-view operation response 250*b* may identify each of the logical-view passbands which have been operated on, and may be indicative of one of a success and a failure of executing each of the operations. Accordingly, the method 258 may further comprise the step of sending the composite logical-view operation response 250*b* to the orchestrator 214 (step 278).

Figure 9:
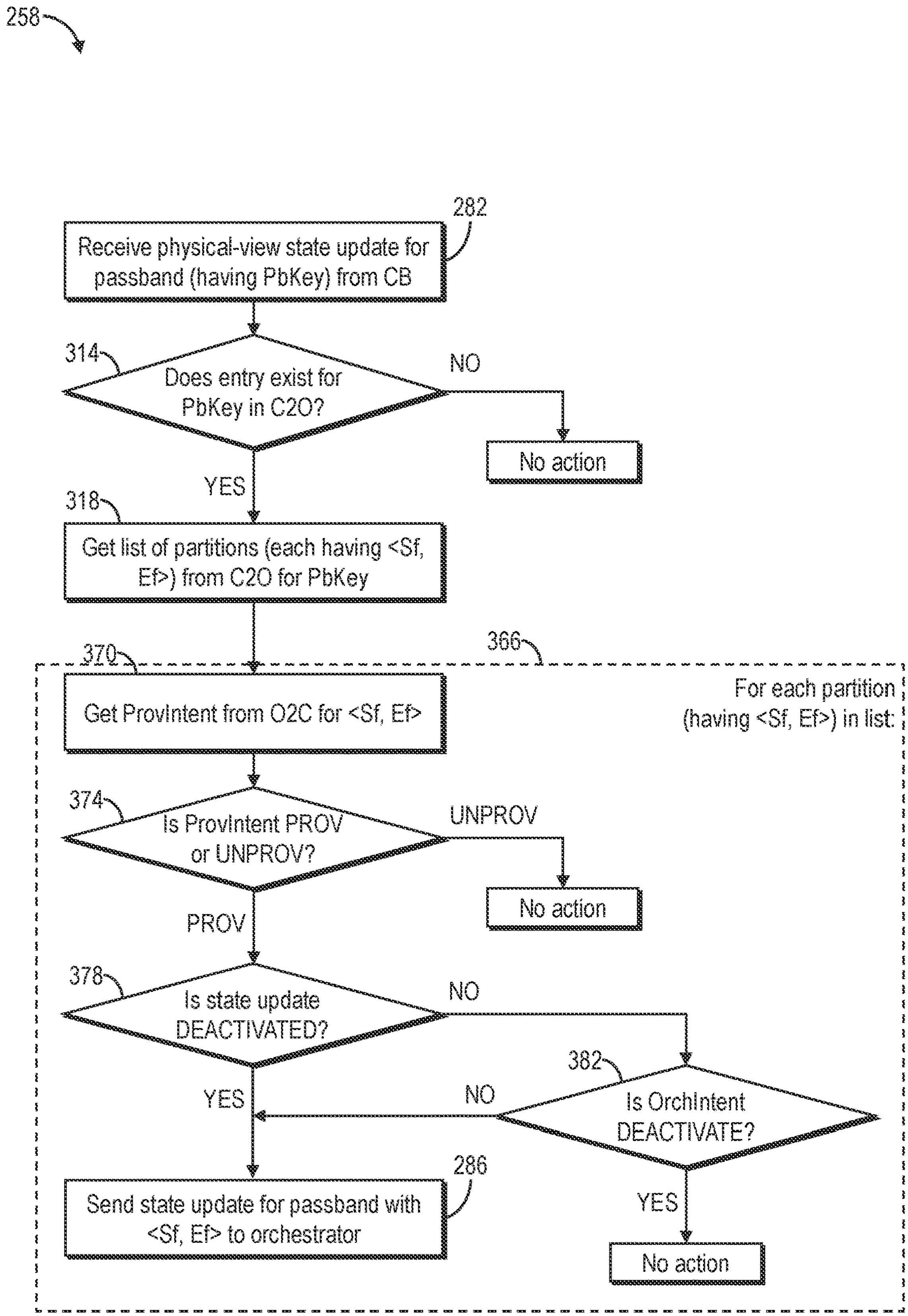
FIG. 9 is another process flow diagram of additional steps of the method shown in FIG. 7C that are performed in some embodiments.

Now referring to FIG. 9, shown therein is a process flow diagram of another exemplary embodiment of the method 258 shown in FIG. 7C further illustrating the reference-counting aspect of the present disclosure. As shown in FIG. 9, in some embodiments, the method 258 may comprise the steps of: receiving the physical-view state update message 254*a* from the control block 218 (step 282), the physical-view state update message 254*a* identifying a physical-view passband and being indicative of a state update; determining whether a passband entry 256*b* exists for the identified physical-view passband in the C2O Table based at least in part on the passband key (step 314); and if a passband entry 256*b* exists for the identified physical-view passband in the C2O Table, retrieving the partition list for the passband entry 256*b* from the C2O Table (step 318).

As further shown in FIG. 9, the method 258 may further comprise a "for" loop 366, wherein the steps of the method 258 contained within the "for" loop 366 are repeated for each partition in the partition list for the identified physical-view passband, each of the identified partitions having a start frequency and an end frequency. The "for" loop 366 may comprise the steps of: retrieving the provisioning intent from the O2C Table 255*a* for the partition based at least in part on the start frequency and the end frequency (step 370); determining if the provisioning intent is PROVISIONED (step 374). If the provisioning intent is PROVISIONED, the method 258 may further comprise determining if the state update for the physical-view passband is a DEACTIVATED state update (step 378); and, if the state update for the physical-view passband is a DEACTIVATED state update, sending the logical-view state update message 254*b* to the orchestrator 214 (step 286). Alternatively, if the state update is not a DEACTIVATED state update, the method 258 may further comprise determining if the orchestration intent is DEACTIVATE (step 382); and, if the orchestration intent is not DEACTIVATE, sending the logical-view state update message 254*b* to the orchestrator 214 (step 286).

From the above description, it is clear that the inventive concepts disclosed and claimed herein are well adapted to carry out the objects and to attain the advantages mentioned herein, as well as those inherent in the invention. While exemplary embodiments of the inventive concepts have been described for purposes of this disclosure, it will be understood that numerous changes may be made which will readily suggest themselves to those skilled in the art and which are accomplished within the spirit of the inventive concepts disclosed and claimed herein.

What is claimed is:

1. An orchestration adapter, comprising:

a processor; and a non-transitory computer-readable medium storing processor-executable instructions that, when executed by the processor, cause the processor to:

store a mapping indicative of a correspondence between a plurality of logical-view passbands and a plurality of physical-view passbands, each of the plurality of physical-view passbands comprising one or more partition, each of the one or more partition corresponding to a particular logical-view passband of the plurality of logical-view passbands;

receive a logical-view operation request from an orchestrator of a network element in an optical network, the logical-view operation request identifying an operation and a first logical-view passband of the plurality of logical-view passbands, the operation being executable by a control block of the network element, the first logical-view passband being associated with the operation; and send a physical-view operation request to the control block, the physical-view operation request comprising instructions to cause the control block to execute the operation, the instructions identifying the operation and a first physical-view passband of the plurality of physical-view passbands, a first partition of the one or more partition of the first physical-view passband corresponding to the first logical-view passband.

2. The orchestration adapter of claim 1, wherein the operation is an activation of a first optical service on a fiber optic line of the optical network.

3. The orchestration adapter of claim 2, wherein the operation is a first operation, the physical-view operation request is a first physical-view operation request, the instructions are first instructions, the logical-view operation request further identifying a second operation and second logical-view passband of the plurality of logical-view passbands, the second operation being executable by the control block, the second operation being an activation of a second optical service on the fiber optic line, the second logical-view passband being associated with the second operation, and the processor-executable instructions, when executed by the processor, further cause the processor to:

responsive to a second partition of the one or more partition of a second physical-view passband corresponding to the second logical-view passband, send a second physical-view operation request to the control block, the second physical-view operation request comprising second instructions to cause the control block to execute the second operation, the second instructions identifying the second operation and a second physical-view passband of the plurality of physical-view passbands, a second partition of the one or more partition of the second physical-view passband corresponding to the second logical-view passband.

4. The orchestration adapter of claim 3, wherein the processor-executable instructions, when executed by the processor, further cause the processor to:

receive a first physical-view operation response from the control block, the first physical-view operation response identifying the first physical-view passband and being indicative of one of a success and a failure of executing the first operation;

receive a second physical-view operation response from the control block, the second physical-view operation response identifying the second physical-view passband and being indicative of one of a success and a failure of executing the second operation; and send a logical-view operation response to the orchestrator, the logical-view operation response identifying the first logical-view passband and the second logical-view passband, and being indicative of one of a success and a failure of executing the first operation and the second operation.

5. The orchestration adapter of claim 3, wherein the logical-view operation request is a first logical-view operation request, the physical-view operation request is a first physical-view operation request, and the processor-executable instructions, when executed by the processor, further cause the processor to:

receive a second logical-view operation request from the orchestrator, the second logical-view operation request identifying a third operation and a particular logical-view passband of the first logical-view passband and the second logical-view passband, the third operation being executable by the control block, the third operation being a deactivation of a particular optical service of the first optical service and the second optical service, the particular logical-view passband being associated with the third operation; and send a third physical-view operation request to the control block, the third physical-view operation request comprising third instructions to cause the control block to execute the third operation, the third instructions identifying the third operation and a particular physical-view passband of the first physical-view passband and the second physical-view passband, a particular partition of the first partition and the second partition corresponding to the particular logical-view passband, the particular physical-view passband comprising the particular partition.

6. The orchestration adapter of claim 2, wherein the operation is a first operation, the physical-view operation request is a first physical-view operation request, the instructions are first instructions, the logical-view operation request further comprises a second operation and second logical-view passband of the plurality of logical-view passbands, the second operation being executable by the control block, the second operation being an activation of a second optical service on the fiber optic line, the second logical-view passband being associated with the second operation, and the processor-executable instructions, when executed by the processor, further cause the processor to:

receive a physical-view operation response from the control block, the physical-view operation response identifying the first physical-view passband and being indicative of one of a success and a failure of executing the first operation; and responsive to a second partition of the one or more partition of the first physical-view passband corresponding to the second logical-view passband, and further responsive to the physical-view operation response being indicative of a success of executing the first operation, send a logical-view operation response to the orchestrator, the logical-view operation response identifying the first logical-view passband and the second logical-view passband, and being indicative of a success of executing the first operation and a success of executing the second operation.

7. The orchestration adapter of claim 6, wherein the physical-view operation request is a first physical-view operation request, the instructions are first instructions, the physical-view operation response is a first physical-view operation response, the logical-view operation response is a first logical-view operation response, and the processor-executable instructions, when executed by the processor, further cause the processor to:

responsive to the second partition corresponding to the second logical-view passband, and further responsive to the physical-view operation response being indicative of a failure of executing the first operation:

send a second physical-view operation request to the control block, the second physical-view operation request comprising second instructions to cause the control block to execute the second operation, the second instructions identifying the second operation and the first physical-view passband;

receive a second physical-view operation response from the control block, the second physical-view operation response identifying the first physical-view passband and being indicative of one of a success and a failure of executing the second operation; and send a second logical-view operation response to the orchestrator, the second logical-view operation response identifying the first logical-view passband and the second logical-view passband, and being indicative of one of a success and a failure of executing the second operation.

8. The orchestration adapter of claim 2, wherein the logical-view operation request is a first logical-view operation request, the operation is a first operation, the instructions are first instructions, the physical-view operation request is a first physical-view operation request, and the processor-executable instructions, when executed by the processor, further cause the processor to:

receive a second logical-view operation request from the orchestrator, the second logical-view operation request identifying a second operation and a second logical-view passband of the plurality of logical-view passbands, the second operation being executable by the control block, the second operation being an activation of a second optical service on the fiber optic line, the second logical-view passband being associated with the second operation; and responsive to a second partition of the one or more partition of a second physical-view passband corresponding to the second logical-view passband, send a second physical-view operation request to the control block, the second physical-view operation request comprising second instructions to cause the control block to execute the second operation, the second instructions identifying the second operation and the second physical-view passband.

9. The orchestration adapter of claim 2, wherein the logical-view operation request is a first logical-view operation request, the operation is a first operation, and the processor-executable instructions, when executed by the processor, further cause the processor to:

receive a second logical-view operation request from the orchestrator, the second logical-view operation request identifying a second operation and a second logical-view passband of the plurality of logical-view passbands, the second operation being executable by the control block, the second operation being an activation of a second optical service on the fiber optic line, the second logical-view passband being associated with the second operation; and responsive to a second partition of the one or more partition of the first physical-view passband corresponding to the second logical-view passband, send a logical-view operation response to the orchestrator, the logical-view operation response identifying the second logical-view passband and being indicative of a success of executing the second operation.

10. The orchestration adapter of claim 9, wherein the logical-view operation response is a first logical-view operation response, and the processor-executable instructions, when executed by the processor, further cause the processor to:

receive a third logical-view operation request from the orchestrator, the third logical-view operation request identifying a third operation and a particular one of the first logical-view passband and the second logical-view passband, the third operation being executable by the control block, the third operation being a deactivation of a particular one of the first optical service and the second optical service, the particular one of the first logical-view passband and the second logical-view passband being associated with the third operation; and responsive to a particular one of the first partition and the second partition corresponding to the particular one of the first logical-view passband and the second logical-view passband, send a second logical-view operation response to the orchestrator, the second logical-view operation response identifying the particular one of the first logical-view passband and the second logical-view passband and being indicative of a success of executing the third operation.

11. The orchestration adapter of claim 10, wherein the physical-view operation request is a first physical-view operation request, the particular one of the first logical-view passband and the second logical-view passband is a first particular one of the first logical-view passband and the second logical-view passband, the particular one of the first optical service and the second optical service is a first particular one of the first optical service and the second optical service, the particular one of the first partition and the second partition is a first particular one of the first partition and the second partition, the instructions are first instructions, and the processor-executable instructions, when executed by the processor, further cause the processor to:

receive a fourth logical-view operation request from the orchestrator, the fourth logical-view operation request identifying a fourth operation and a second particular one of the first logical-view passband and the second logical-view passband, the fourth operation being executable by the control block, the fourth operation being a deactivation of a second particular one of the first optical service and the second optical service, the second particular one of the first logical-view passband and the second logical-view passband being associated with the fourth operation; and responsive to a second particular one of the first partition and the second partition corresponding to the second particular one of the first logical-view passband and the second logical-view passband, send a second physical-view operation request to the control block, the second physical-view operation request comprising second instructions to cause the control block to execute the fourth operation, the second instructions identifying the fourth operation and the first physical-view passband.

12. The orchestration adapter of claim 1, wherein the processor-executable instructions are separate from the orchestrator and the control block.

13. The orchestration adapter of claim 1, wherein the control block controls a wavelength-selective switch.

14. The orchestration adapter of claim 1, wherein the control block comprises a wavelength-selective switch control block and a line amplifier control block, the wavelength-selective switch control block controlling a wavelength-selective switch, the line amplifier control block controlling one or more line amplifier on a fiber optic line of the optical network.

15. The orchestration adapter of claim 1, wherein the processor-executable instructions, when executed by the processor, further cause the processor to:

receive a physical-view state update message from the control block, the physical-view state update message identifying a state update and the first physical-view passband, the state update being associated with the first physical-view passband; and send a logical-view state update message to the orchestrator, the logical-view state update message identifying the first logical-view passband and being indicative of the state update.

16. The orchestration adapter of claim 6, wherein the processor-executable instructions, when executed by the processor, further cause the processor to determine that the first logical-view passband has been provisioned by a user, wherein the step of sending the logical-view state update message to the orchestrator is further defined as, responsive to the determination that the first logical-view passband has been provisioned by the user, sending the logical-view state update message to the orchestrator.

17. The orchestration adapter of claim 1, wherein the processor-executable instructions, when executed by the processor, further cause the processor to:

receive a physical-view operation response from the control block, the physical-view operation response identifying the first physical-view passband and being indicative of one of a success and a failure of executing the operation; and send a logical-view operation response to the orchestrator, the logical-view operation response identifying the first logical-view passband and being indicative of one of a success and a failure of executing the operation.

18. The orchestration adapter of claim 1, wherein a second partition of the one or more partition of the first physical-view passband corresponds to a second logical-view passband.

19. The orchestration adapter of claim 1, wherein the operation is one of an activation of an optical service on a fiber optic line of the optical network, a deactivation of the optical service, a reservation of the network element for the activation of the optical service, a release of the network element from the reservation, and an adjustment of a configuration of the network element.

20. The orchestration adapter of claim 1, wherein the mapping is further indicative of a correspondence between a frequency range of each of the plurality of logical-view passbands and a unique identifier of each of the plurality of physical-view passbands, the frequency range of each of the plurality of logical-view passbands being defined by a start frequency and an end frequency.

21. The orchestration adapter of claim 1, wherein the processor-executable instructions, when executed by the processor, further cause the processor to determine that the first logical-view passband has been provisioned by a user, wherein the step of sending the physical-view operation request to the control block is further defined as, responsive to the determination that the first logical-view passband has been provisioned by the user, sending the physical-view operation request to the control block.

* * * * *